(12) United States Patent
Chuah et al.

(10) Patent No.: US 7,596,093 B2
(45) Date of Patent: Sep. 29, 2009

(54) METHOD AND SYSTEM FOR ISOLATION OF A FAULT LOCATION IN A COMMUNICATIONS DEVICE

(75) Inventors: John Tiong-Heng Chuah, Kanata (CA); Joseph Moffette, Ottawa (CA)

(73) Assignee: Alcatel-Lucent Canada Inc., Kanata, Ontario (CA)

( * ) Notice: Subject to any disclaimer, the term of this patent is extended or adjusted under 35 U.S.C. 154(b) by 283 days.

(21) Appl. No.: 11/623,720

(22) Filed: Jan. 16, 2007

(65) Prior Publication Data

US 2007/0180331 A1 Aug. 2, 2007

Related U.S. Application Data

(63) Continuation of application No. 10/025,741, filed on Dec. 26, 2001, now Pat. No. 7,206,287.

(51) Int. Cl.
  *H04J 1/16* (2006.01)
  *H04J 3/14* (2006.01)
(52) U.S. Cl. .................. 370/241; 370/242; 370/250
(58) Field of Classification Search ............... None
  See application file for complete search history.

(56) References Cited

U.S. PATENT DOCUMENTS

| | | | | |
|---|---|---|---|---|
| 5,710,760 | A * | 1/1998 | Moll | 370/249 |
| 6,141,326 | A * | 10/2000 | Minami | 370/244 |
| 6,442,694 | B1 * | 8/2002 | Bergman et al. | 726/22 |
| 6,597,689 | B1 * | 7/2003 | Chiu et al. | 370/354 |
| 6,700,873 | B1 * | 3/2004 | Sugaya et al. | 370/241.1 |

* cited by examiner

*Primary Examiner*—Ajit Patel

(57) ABSTRACT

The present invention provides a system and method of identifying a failure location in a datapath in a communication element, the datapath traversing from an ingress point through at least a first component to an egress point. In an embodiment the method comprises: providing a diagnostic cell to adapted to be inserted at a startpoint upstream of the first component in the datapath; providing at least a first diagnostic cell counter module adapted to be associated with a first location in the first component, the first diagnostic cell counter module being adapted to recognize when the diagnostic cell passes the first location and being adapted to track passage of the diagnostic cell past the first location; inserting the diagnostic cell into the datapath at the starting point; and analyzing the diagnostic cell counter module to identify the failure location in the datapath.

13 Claims, 16 Drawing Sheets

| # | 1 | 2 | 3 | 4 | 5 | 6 | 7 | SUSPECTED LOCATION(S) |
|---|---|---|---|---|---|---|---|---|
| 1 | 0 | 0 | 0 | 0 | 0 | 0 | 0 | COMPONENT 1 |
| 2 | 1 | 0 | 0 | 0 | 0 | 0 | 0 | COMPONENT 1 |
| 3 | 1 | 1 | 0 | 0 | 0 | 0 | 0 | COMPONENT 1, COMPONENT 2 |
| 4 | 1 | 1 | 1 | 0 | 0 | 0 | 0 | COMPONENT 3 |
| 5 | 1 | 1 | 1 | 1 | 0 | 0 | 0 | COMPONENT 3, COMPONENT 4 |
| 6 | 1 | 1 | 1 | 1 | 1 | 0 | 0 | COMPONENT 5 |
| 7 | 1 | 1 | 1 | 1 | 1 | 1 | 0 | COMPONENT 6 |
| 8 | 1 | 1 | 1 | 1 | 1 | 1 | 1 | NO ERROR |

FIG. 7

METHOD AND SYSTEM FOR ISOLATION OF A FAULT LOCATION IN A COMMUNICATIONS DEVICE

This is a continuation application of U.S. patent application Ser. No. 10/025,741 filed on Dec. 26, 2001 now U.S. Pat. No. 7,206,287.

FIELD OF THE INVENTION

The invention relates generally to a method and system for isolation of a fault location in a communications device, such as a routing switch.

BACKGROUND

In a communications network, there is a need for providing a high level of service availability for data traffic travelling on a datapath in the network. If there is a problem with a network element, such as a node or a link, the data traffic is re-routed onto an alternate datapath. At the network element level, as the service availability of each node and link may affect the overall service availability of the network, it is necessary to monitor each node and link for faults in order to maintain a high level of service availability for those nodes and links.

For example, a node comprising a routing switch may be monitored for faults so that its service availability can be maintained at a high level. While providing redundant datapaths within the routing switch partially addresses the issue of maintaining high service availability, it is also desirable to be able to isolate a fault, and to repair or replace any faulty components within the routing switch, so that the redundancy built into the routing switch continues to be fully functional. In the event of faults occurring in both redundant datapaths, the requirement for isolating and replacing a faulty component becomes more urgent.

The type of fault occurring within a device, such as a routing switch, may not be severe enough to cause the routing switch, or an adjacent link, to fail completely. Rather, the fault may be of such a severity that performance of the node is noticeably or significantly degraded. In such a situation, it is desirable to isolate, repair or replace any failing component or components so that performance of the device is fully restored, and so that more severe faults can be preemptively corrected and avoided.

In the prior art, various solutions have been proposed for isolating a datapath fault. One such solution involves a loop-back test in which a test signal is used to test whether a "looped-back" datapath provided within the routing switch is able to successfully complete a transmission of the test signal. A successful test suggests that the datapath is functioning normally. A failed test indicates that the datapath has a fault. However, depending on the configuration of the datapath, it is often not clear which component in the datapath is failing. It may then be necessary to proceed by trial and error, replacing a component and retesting the datapath to see if the fault has been corrected by the replaced component. While the source of the fault may be eventually identified through this trial and error method, it can be tedious and time consuming, potentially resulting in poor service availability. Furthermore, if the fault is intermittent, a trial and error method in replacing each component in turn may not be successful in identifying a faulty component the first time. Thus, the trial and error process may need to be repeated.

In another aspect, in devices having redundant datapaths, upon occurrence of a fault in an active datapath, prior art solutions generally do not provide the capability to test the inactive datapath for faults using a loop-back test. Thus, if a datapath switchover is being contemplated due to faults occurring in the active datapath, it may not be possible to determine whether the switchover to the inactive datapath may be desirable, in case the inactive datapath is worse off.

Thus, there is a need for an improved system and method of isolating a fault within a device, such as a routing switch, so that the fault can be corrected quickly and service availability of the device can be improved.

SUMMARY

In a first aspect, a method of identifying a failure location in a datapath in a communication element is provided. The datapath traverses from an ingress point through at least a first component to an egress point. The method comprises:

Providing a diagnostic cell to adapted to be inserted at a startpoint upstream of the first component in the datapath;

Providing at least a first diagnostic cell counter module adapted to be associated with a first location in the first component. The first diagnostic cell counter module is adapted to recognize when the diagnostic cell passes the first location and is adapted to track passage of the diagnostic cell past the first location;

Inserting the diagnostic cell into the datapath at the starting point; and

Analyzing the diagnostic cell counter module to identify the failure location in the datapath.

The method may have the diagnostic cell counter module tracking passage of the diagnostic cell past the location using a counter.

The method may have the failure location being identified as being downstream of the first location when the diagnostic cell counter module recognized that the diagnostic cell passed the first location.

The method may have a second diagnostic cell counter module provided at a second location in the datapath. The second diagnostic cell counter module may be adapted to recognize when the diagnostic cell passes the second location and may be adapted to track passage of the diagnostic cell past the second location.

The method may have the failure location being identified as being downstream of the second location when the second diagnostic cell counter recognized that the diagnostic cell passed the second location.

The method may have the datapath traversing an ingress line card, a switching fabric and an egress line card, the starting point being upstream of the ingress line card, and the first component being selected from one of the ingress line card and the egress line card. Further, the method may have the datapath as being a VPI/VCI connection.

Alternatively still, the method may have the datapath traversing an ingress line card and returning through the ingress line card. Further, the method may have the datapath as being a VPI/VCI connection.

In a second aspect, a system for identifying a failure location in a datapath in a communication element is provided. The datapath traverses from an ingress point through at least a first component to an egress point. The system comprises:

At least a first diagnostic cell counter module adapted to be associated with a first location in the first component. The first diagnostic cell counter module is adapted to recognize when a diagnostic cell passes the first location and adapted to track passage of the diagnostic cell past the first location; and An analysis module adapted to analyze the diagnostic cell counter module to identify the failure location in the datapath.

The system may have the diagnostic cell counter module tracking passage of the diagnostic cell past the location using a counter.

The system may have the analysis module identifying the failure location as being downstream of the first location when the diagnostic cell counter module recognized that the diagnostic cell passed the first location.

The system may have a second diagnostic cell counter module being provided at a second location in the datapath. The second diagnostic cell counter module may be adapted to recognize when the diagnostic cell passes the second location and may be adapted to track passage of the diagnostic cell past the second location.

The system may have the analysis module being adapted to identify the failure location as being downstream of the second location when the second diagnostic cell counter recognized that the diagnostic cell passed the second location.

The system may have the datapath as being a VPI/VCI connection.

In other aspects of the invention, various combinations and subsets of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 7 is an exemplary fault isolation table for use in conjunction with an embodiment;

DETAILED DESCRIPTION OF EMBODIMENTS

Figure 1A:
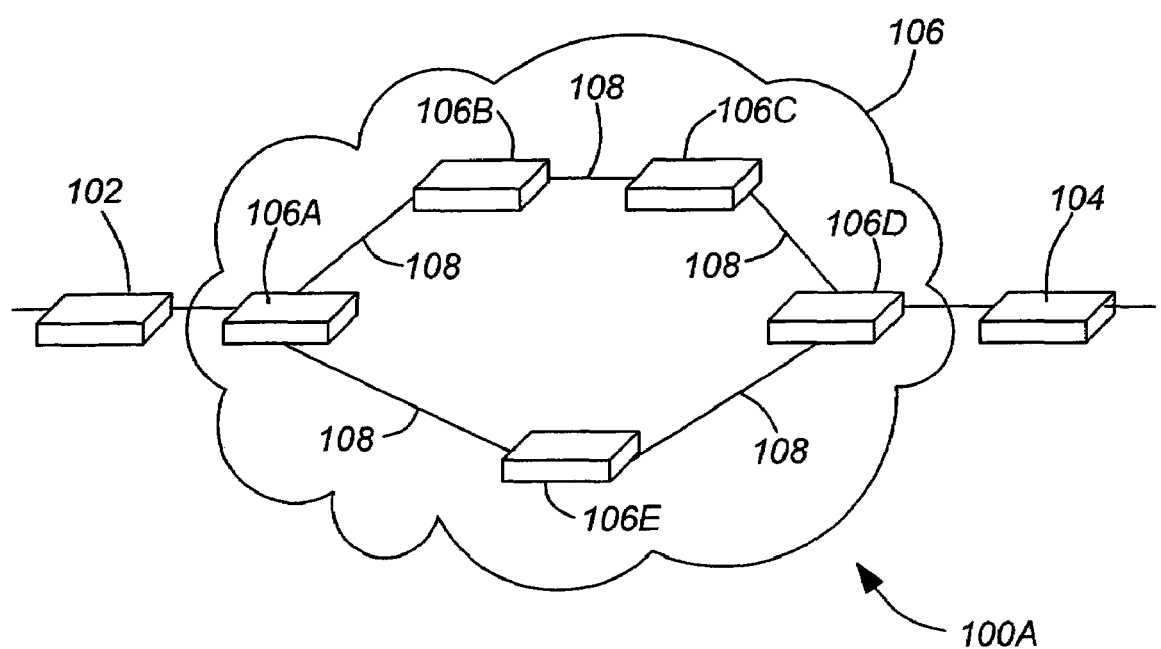
FIG. 1A is a block diagram of a communications network associated with a communications device in which a system and method embodying the invention may be practiced.

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

Referring to FIG. 1A, a communication network 100A is shown. Network 100A allows an originating or source node 102 to communicate with a destination node 104 through network cloud 106. More specifically, the source node is connected to a plurality of switching nodes 106A ... 106E within network cloud 106. Switching nodes 106A ... 106E form the communications backbone of network cloud 106. In turn, the plurality of switching nodes 106A ... 106E are connected to the destination node 104 on the other side of network cloud 106.

Still referring to FIG. 1A, the ports on the switching nodes 106A ... 106E may be physically interconnected by physical interconnects or links 108. The links 108 may comprise, for example, standard physical interfaces such as OC-3, OC-12 or DS3. The links 108 between nodes 106A ... 106E allow a plurality of routing paths for communications sent between the source node 102 and the destination node 104. As a simplified example, one datapath is provided by nodes 106A-106B-106C-106D and another datapath is provided by nodes 106A-106E-106D. The availability of each individual node in a datapath affects whether the datapath is available or not.

Figure 1B:
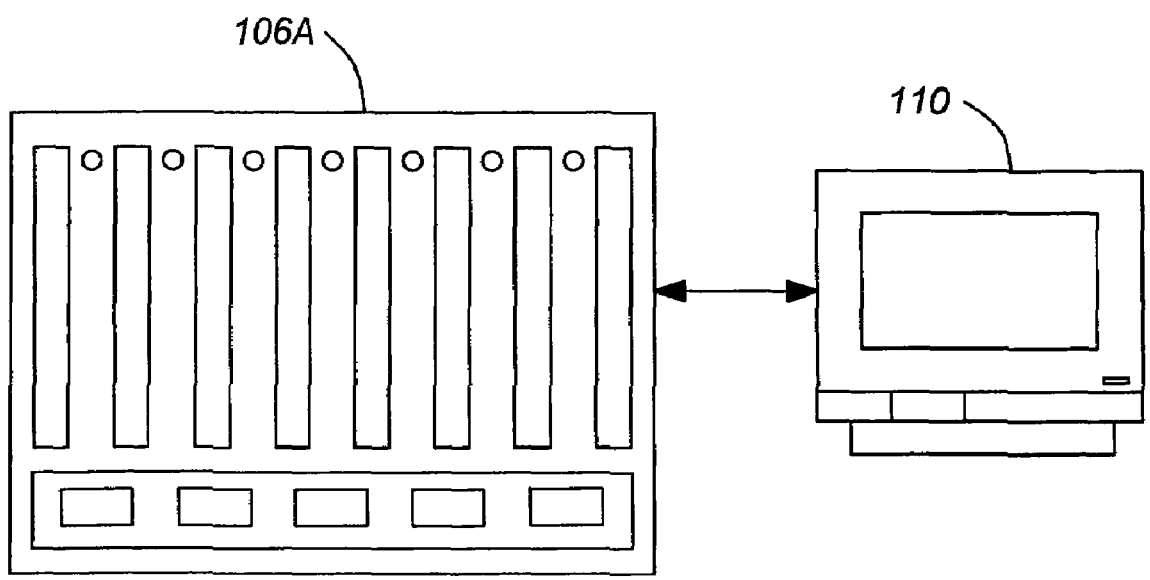
FIG. 1B is a block diagram representative of a communications device in the communications network connected to an operator station for monitoring the communications device.

Now referring to FIG. 1B, a single switching node 106A is shown by way of example having a monitor 110 connected thereto for use by an operator for controlling certain functions in the switching node 106A. As will be explained below, the monitor 110 may also serve as an interface for performing various diagnostics on the switching node 106A in the event of a fault within the switching node 106A. While not shown, each of the other switching nodes 106B ... 106E, the originating node 102, and the destination node 104 may also have a monitor 110 for performing such operator functions.

Figure 2A:
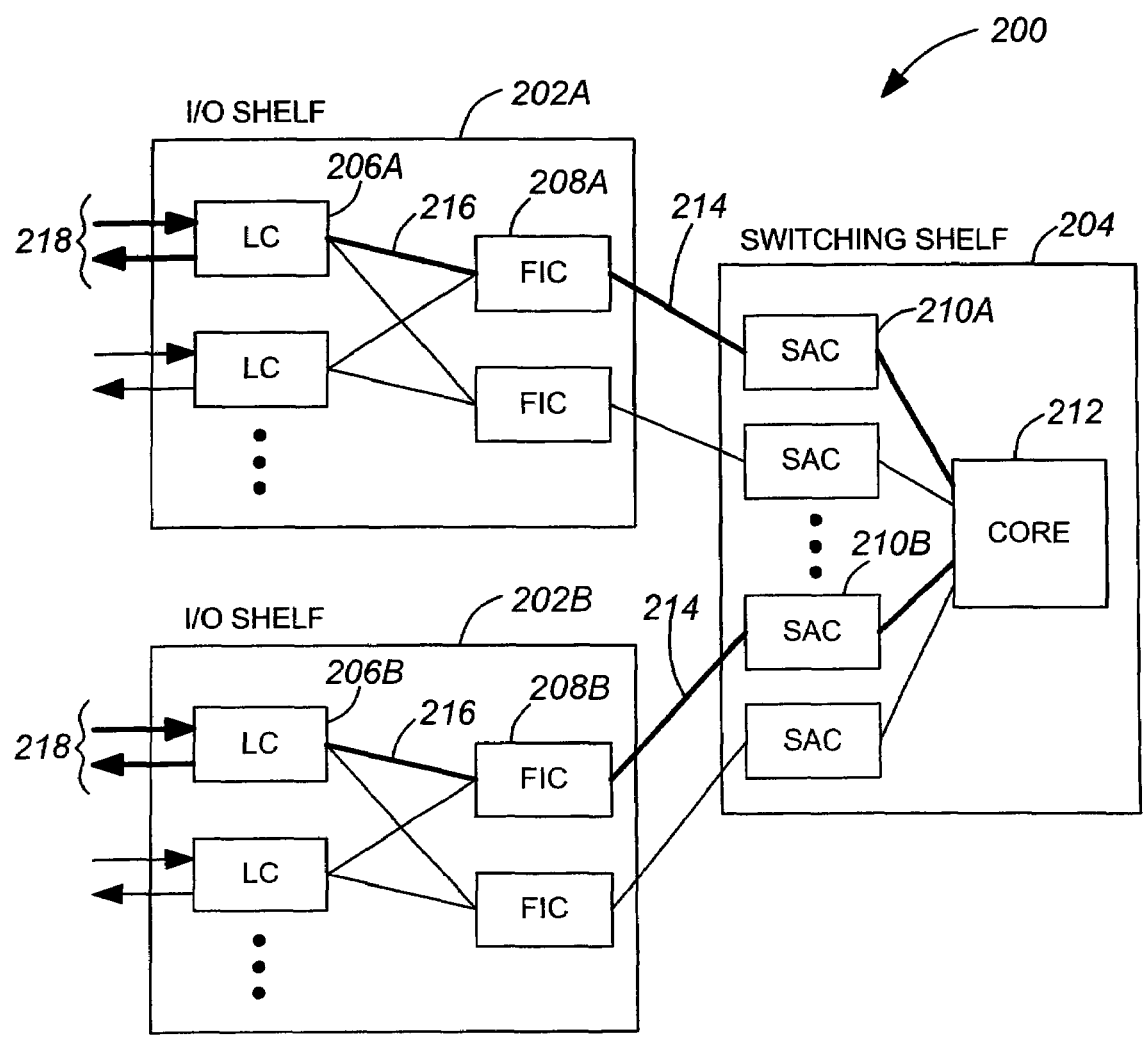
FIG. 2A is a block diagram showing details of certain components within the communications device of FIG. 1B linked together by physical channels.
Figure 2B:
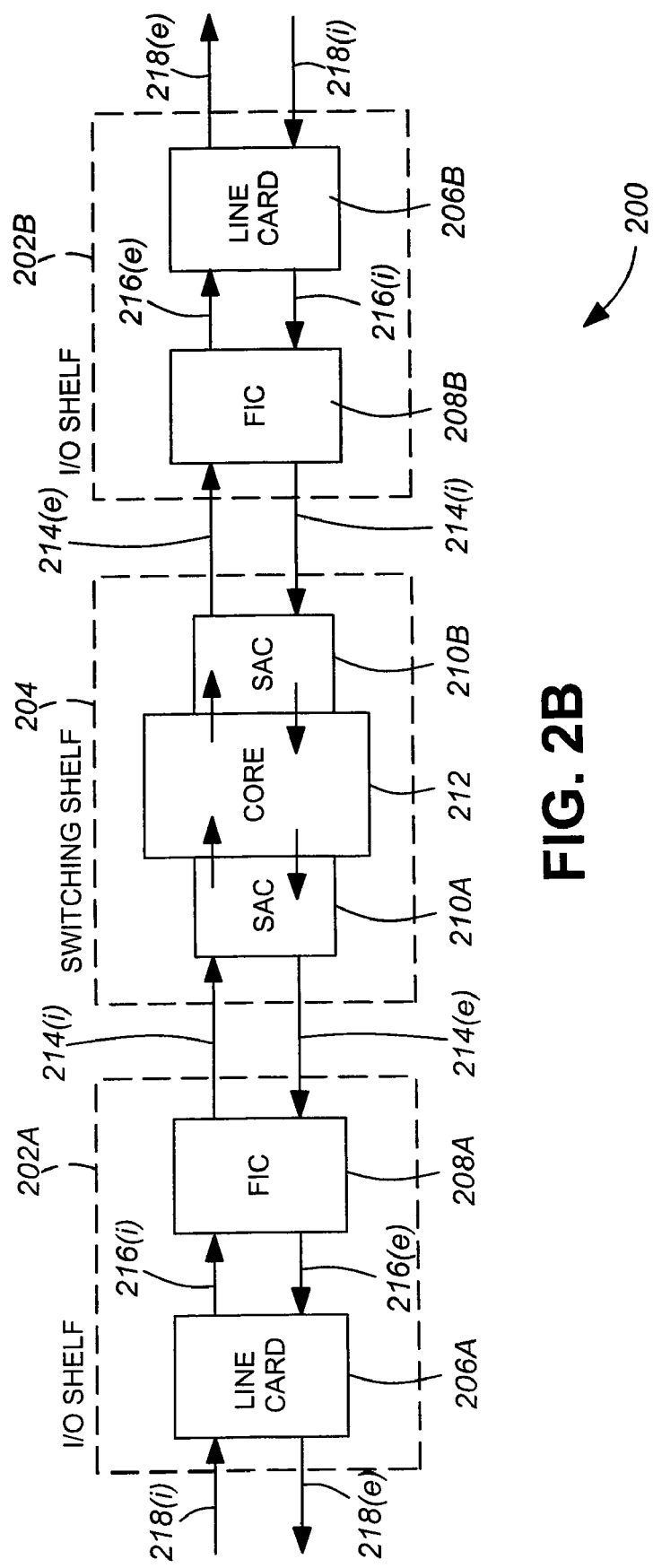
FIG. 2B is another block diagram showing one of the component paths shown in FIG. 2A in a straight line.

Now referring to FIGS. 2A and 2B, shown and generally referred to by reference numeral 200 are various components which may be found within a communications device such as switching node 106A. By way of example, shown is an I/O shelf 202A containing a line card 206A and a fabric interface card ("FIC") 208A. A second I/O shelf 202B is shown containing a line card 206B and a FIC 208B. Also shown is a switching shelf 204, which contains first and second switch access cards ("SAC") 210A, 210B and a switch core 212. Each I/O shelf 202A, 202B is connected to the switching shelf 204 by means of suitable communications links 214.

More specifically, each FIC 208A, 208B in each I/O shelf 202A, 202B is connected to one of first and second SACs 210A, 210B in the switching shelf 204. For example, and not by way of limitation, the communications links 214 connecting each FIC 208A, 208B to a SAC 210A, 210B may comprise a pair of high-speed inter-shelf links ("HISL"), one providing a path in an ingress direction towards the switching core 212 and another providing a path in an egress direction away from the switching core 212.

Each FIC 208A, 208B in turn is connected to a line card 206A, 206B by means of communications links 216. For example, and not by way of limitation, the communications links 216 may comprise a pair of line card fabric interface ("LFI") links which provide a path in an ingress direction and an egress direction, similar to the HISLs connecting the FICs 208A, 208B to the SACs 210A, 210B. Each line card 206A, 206B provides an I/O interface for data being received from and transferred to various adjacent switching nodes (not shown) by means of communications links 218.

Still referring to FIG. 2, data traffic entering the communications link 218(i) into line card 206A in I/O shelf 202A proceeds through link 216(i) to FIC 208A. Data traffic passes through the SAC 210A and enters the switching core 212. Data traffic is routed through the switching core 212 to an appropriate egress path and sent in an egress direction to a communication network along the selected egress path through SAC 210B, link 214(e), FIC 208B, link 216(e), line card 206B, and finally link 218(e) towards an adjacent switching node (not shown). A similar datapath may be provided in the opposite direction for data traffic entering link 218(i) into line card 206B, and exiting through link 218(e) from line card 206A. FIG. 2 thus provides a possible layout of various components which may be found within a switching node such as the switching node 106A described above. However, it is to be understood that FIG. 2 provides only a possible layout of the components and that the particular layout and the particular data flows described are not limiting. For example, data traffic entering the link 218(i) into line card 206A may be processed in the switching core 212 and directed back towards line card 206A in a loop-back fashion.

Figure 3:
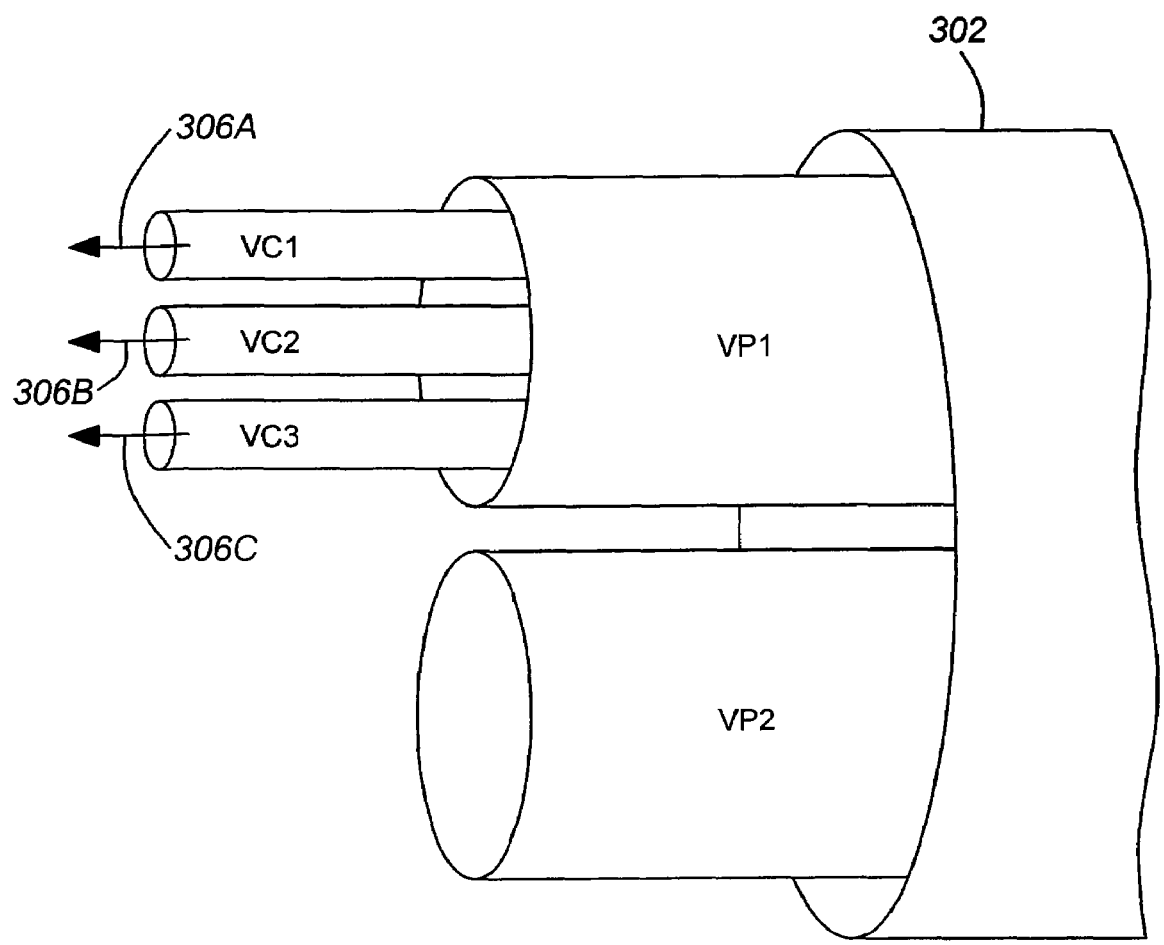
FIG. 3 is a schematic diagram of multiple virtual paths/virtual channels which may be carried within a physical channel in FIG. 2.

Now referring to FIG. 3, a schematic diagram of a physical path carrying a plurality of virtual paths and channels is shown. In an illustrative embodiment, the paths and channels provide a mapping of data transmissions to logical and physical routes, and may form a part of an asynchronous transfer mode (ATM) network. A physical channel or link 302 may carry one or more virtual paths ("VP") of which VP1 is one and VP2 is another. Each VP may carry a number of virtual channels ("VC") of which VC1, VC2 and VC3 are examples. A virtual path identifier ("VPI") and a virtual channel identifier ("VCI") together form a unique VPI/VCI address to identify a particular ATM path/channel.

While a VPI/VCI connection for an ATM path/channel has been described for the purposes of illustration, it will be appreciated that the teachings of the present invention is equally applicable to other types of networks including IP, MPLS, frame relay, etc.

Still referring to FIG. 3, each VPI/VCI connection carries a particular traffic stream through the physical channel 302. For instance, VC1, VC2, VC3 may carry first, second and third data traffic flows 306A, 306B, 306C where each of these traffic flows may originate from a different traffic source and may be associated with differentiated classes of service.

It will be appreciated by those skilled in the art that, in accordance with prior art, testing and diagnostics of the physical links and components in switching node 106A may be conducted by testing a datapath (provided by a VPI/VCI connection for example), passing through the physical links and components described and shown, for example, in FIGS. 2A and 2B. A diagnostic cell may be passed through the datapath and monitored to ensure that the diagnostic cell traverses the length of the datapath without error or fault. However, failure of a diagnostic cell to traverse the datapath only identifies an error or fault somewhere in the datapath. Higher resolution of fault isolation is desirable so that a faulty link or component can be quickly identified and replaced in the field. This will help to maintain a high level of service availability for the communications device and any communications network associated with the communications device.

It will be appreciated by those skilled in the art that the "diagnostic cell" referred to above may be any type of cell that can be distinguished from a customer cell, for example by a unique cell header or label. It will also be appreciated that the term "diagnostic packet" or "diagnostic frame" may be more appropriate for describing the type of protocol data unit ("PDU") being used for a particular embodiment to practice the invention.

Thus, in accordance with an embodiment, in order to isolate a fault in a communications device to a particular link or component, or a particular set of links and/or components, a diagnostic cell datapath is established through the various links and components of interest. Selected components along the diagnostic cell datapath are provided with cell match counters which are able to recognize when a diagnostic cell traverses the counter.

Generally, a cell match counter may have a module which is adapted to monitor the data traffic passing in the datapath using circuits known in the art. The cell match counter can examine the contents of each cell (via its header, label, or other identifier) passing in the datapath and recognize when a diagnostic cell passes thereby. At such time, the cell match counter would increment an internal counter which tracks the number of diagnostic cells recognized. This count value can be provided, for example, to a control module in the switching node for collective analysis with results from other cell match counters. In an embodiment, the cell match counter may be provided, for example, in a field programmable gate array (FPGA) or an application specific integrated circuit (ASIC) within a component. It will be appreciated that other embodiments are possible for the cell match counter.

In accordance with an embodiment, diagnostic cells are inserted into an insertion point at a first end of the diagnostic cell datapath and transmitted through the various components along the datapath. A diagnostic cell extraction point is provided at a second end of the diagnostic cell datapath, and it is expected that the diagnostic cell should be received thereat within a predefined period of time. If the diagnostic cell is not received at the extraction point, then it can be assumed that a data communication error has occurred in the datapath. The last known functioning point along the datapath is the preceding match counter before the first cell match counter that has failed to recognize and count the diagnostic cell. This may be determined, for example, by comparing the number of counts at each cell match counter after a predetermined number of diagnostic cells have been inserted into the datapath for transport through the datapath. Such diagnostic cells may be inserted into the datapath at a predetermined ingress insertion point. A corresponding diagnostic cell extraction point at the end of the datapath allows diagnostic cells to be removed from the diagnostic cell datapath.

Based on the number of counts at each cell match counter, and the locations of the cell match counters, it is possible to isolate a fault to a particular link or component, or to a set of links and/or components in the datapath. Generally speaking, the number and the location of cell match counters placed along the datapath will determine the resolution at which faults can be isolated. At some point, increasing the number of cell match counters would increase cost without necessarily increasing resolution. In accordance with an embodiment of the invention, a sufficient number of cell match counters are provided to provide enough resolution to isolate a fault to a particular component or field replaceable unit (FRU). In some cases, the placement of cell match counters into certain links or components or at certain locations in the datapath may not be possible. In this case, some resolution may be lost at certain locations or in certain regions along the datapath.

In order to illustrate the concepts described above, several examples are now provided showing and describing various aspects and embodiments.

I. Non-Disruptive Fault Isolation Tests

In a first aspect, the fault isolation tests may be conducted without any significant disruption to the flow of normal data traffic passing through the physical links and components. In the non-disruptive embodiments, diagnosis and correction of minor problems or intermittent problems in the datapath should have minimal impact on normal data traffic.

EXAMPLE 1

Non-Disruptive Endpoint-to-endpoint Fault Isolation Test

Figure 4A:
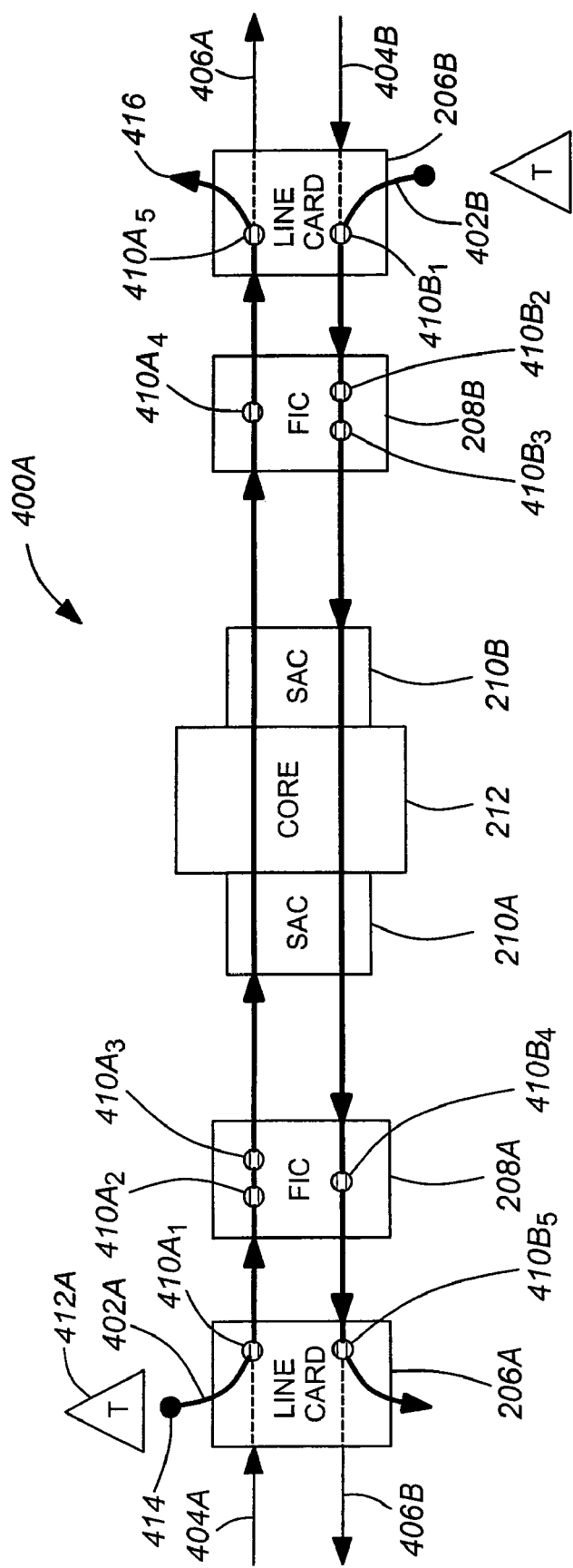
FIG. 4A is a block diagram showing an endpoint-to-endpoint fault isolation test for testing the components in FIG. 2 in accordance with an embodiment.

Now referring to FIG. 4A, shown and generally referred to by reference numeral 400A are the various components of FIG. 2 with data traffic flows more clearly illustrated and the dashed outlines of the I/O shelves 202A, 202B and the switching shelf 204 removed. In FIG. 4A, located at a first end of the components 400A is an ingress communications link 404A which connects to the line card 206A. The datapath beginning with link 404A passes through the various links and components shown in FIG. 4A and exits at an egress communications link 406A exiting another line card 206B. The datapath corresponds to the path previously described with reference to FIG. 2. A second datapath begins at an ingress communications link 404B which enters line card 206B and exits at communications link 406B exiting line card 206A.

Still referring to FIG. 4A, shown in bold is a first diagnostic cell datapath 402A which enters line card 206A and passes through the links and components before exiting line card 206B. In an embodiment, the diagnostic cell 412A may be defined by a particular pattern in the diagnostic cell header or label, and the diagnostic cell datapath 402A may comprise a particular VPI/VCI connection which is dedicated to the diagnostic function and unavailable for other data traffic. In another embodiment, a dedicated VPI/VCI connection is not required, and it is sufficient that the diagnostic cell 412A is readily distinguishable from other data traffic.

As shown, the diagnostic cell datapath 402A coincides substantially with the datapath defined through the links and components, beginning with link 404A and ending with link 406A. As the diagnostic cell datapath 402A may comprise a dedicated logical path, performing a diagnostic test on the diagnostic cell datapath 402A still allows regular data traffic to be transmitted through other logical paths or channels sharing the same physical links and components. Thus, this endpoint-to-endpoint fault isolation test may be characterized as a non-disruptive test.

At various locations along the diagnostic cell datapath 402A, cell match counters $410A_1 \ldots 410A_5$ are provided to recognize and count any diagnostic cells that traverse the cell match counters $410A_1 \ldots 410A_5$. The cell match counters $410A_1 \ldots 410A_5$ may comprise software or hardware modules controlled locally which have interfaces to the datapath allowing each to examine the passing cell header or label to recognize a diagnostic cell 412A which is inserted into the diagnostic cell datapath 402A. Upon recognizing a cell 412A, each cell match counter $410A_1 \ldots 410A_5$ may increment a count. The cell match counters $410A_1 \ldots 410A_5$ can be located at specific points in the datapath to provide integrity information for the partial path of datapath 402A upstream from a particular cell match counter $410A_1 \ldots 410A_5$ to isolate a faulty link or component. For example, one cell match counter $410A_1$ is located at an insertion point 414 into line card 206A. Two cell match counters $410A_2$ and $410A_3$ are located in FIC 208A, one near an ingress port of the FIC 208A and another near an egress port of the FIC 208A. Another cell match counter $410A_4$ is also located on the FIC 208B in the egress direction. Finally, a cell match counter $410A_5$ is located in line card 206B in the egress direction. It will be appreciated that the above description of the locations of cell match counters $410A_1 \ldots 410A_5$ is provided by way of example and that more or less cell match counters $410A_1 \ldots 410A_5$ may be provided per FRU.

As an example, a diagnostic cell 412A may comprise an ATM cell with special header information uniquely identifying the cell as a diagnostic cell 412A. While one type of diagnostic cell 412A is sufficient for a diagnostic run, more than one type of diagnostic cell may be used contemporaneously. In this case, the cell match counters $410A_1 \ldots 410A_5$ need to be programmed to recognize the different types of diagnostic cells.

For the purposes of this example, the SACs 210A, 210B and the switching core 212 do not have any cell match counters located therein. This may be due to, say, technical limitations of placing cell match counters within the SACs 210A, 210B and the switching core 212. It will be appreciated, however, that this example is not meant to be limiting and that, in alternative embodiments, the SACs 210A, 210B and the switching core 212 are all provided with cell match counters. However, in the present example, if a particular component such as the switching core 212 does not have a cell match counter located therein, then it may not be possible to isolate a fault at points in the switching core without taking further diagnostic steps.

Still referring to FIG. 4A, another cell test datapath 402B is shown travelling in the opposite direction through the various components, and a corresponding set of cell match counters $410B_1 \ldots 410B_5$ are provided at various locations along that cell test datapath 402B. For the purposes of this example, only the first cell test datapath 402A is described in detail, but it will be appreciated that the description is also applicable to the second cell test datapath 402B with necessary changes in points of detail.

Figure 4B:
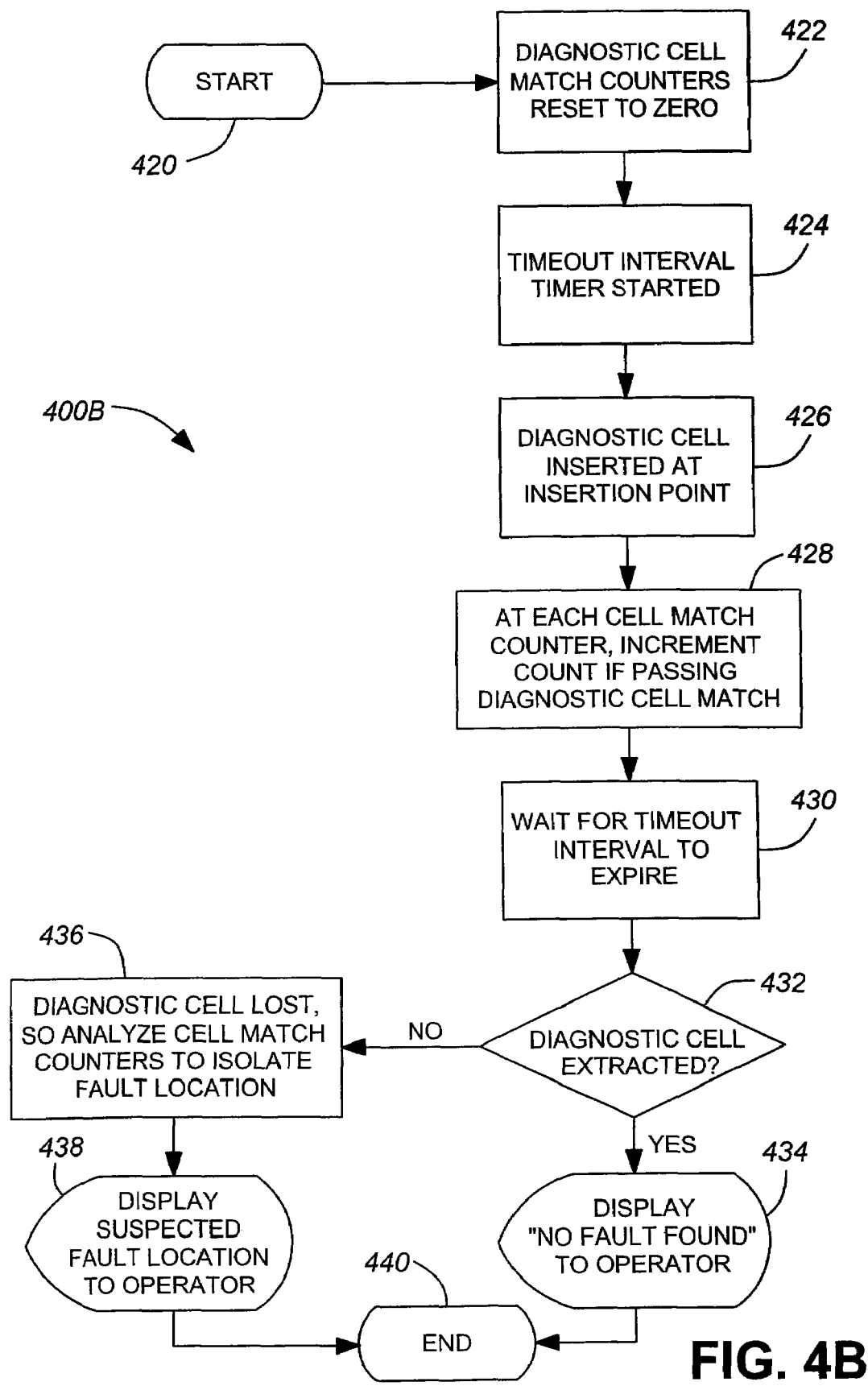
FIG. 4B is a flow chart of a process corresponding to the endpoint-to-endpoint isolation test of FIG. 4A.

Now referring to FIG. 4B, a process 400B is shown for carrying out an endpoint-to-endpoint diagnostic test in the configuration of FIG. 4A, in particular the diagnostic cell datapath 402A. It will be appreciated that process 400B may be embodied in appropriate software modules. The software modules may be located on a centrally accessible control module, such as a control card associated with the switching node 106B. The software module will have the ability to access the count values in the diagnostic cell counters and provide reports to an operator. The diagnostic process 400B starts at block 420 and proceeds to block 422 where all cell match counters $410A_1 \ldots 410A_5$ are reset to zero.

The diagnostic process 400B then proceeds to block 424 at which a timer is started to measure a predetermined timeout interval T. Contemporaneously with the starting of the timer at block 424, a diagnostic cell 412A is inserted at the cell insertion point 414 into line card 206A.

The timeout interval T is set to be sufficiently long so that the diagnostic cell 412A can traverse the diagnostic cell datapath 402A and be extracted from the cell extraction point 416 at line card 206B before expiration of the timeout interval T. This assumes, of course, that the diagnostic cell 412A is not otherwise lost as it traverses the diagnostic cell datapath 402A.

The process 400B then proceeds to block 428 where the diagnostic cell 412A is analyzed by a cell match counter $410A_1 \ldots 410A_5$ in the diagnostic cell datapath 402A. As noted above, if the diagnostic cell 412A matches the cell identification information stored in the cell match counter $410A_1 \ldots 410A_5$, the cell match counter $410A_1 \ldots 410A_5$ will increment its count.

The process 400B then proceeds to decision block 430 at which process 400B waits for the timeout interval T to expire. Once the timeout interval T expires, process 400B proceeds to decision block 432 where process 400B determines whether the diagnostic cell 412A was successfully extracted from the diagnostic cell extraction point 416 before expiry of timeout interval T. If so, the diagnostic cell was not lost in the diagnostic cell datapath 402A and the associated datapath appears to be operating correctly. Process 400B thus proceeds to block 434 at which process 400B displays a message to the operator indicating "no fault found".

If, at decision block 432, process 400B determines that the diagnostic cell 412A was not successfully extracted before expiry of timeout interval T, then process 400B proceeds to block 436, at which the cell match counters $410A_1 \ldots 410A_5$ are analyzed to determine their count values. Examining and analyzing the count of each cell match counter $410A_1 \ldots 410A_5$ along the diagnostic cell datapath 402A, process 400B expects that one or more of the cell match counters $410A_1 \ldots 410A_5$ will not have seen the diagnostic cell 412A and, therefore, will not have incremented their counts.

For example, say the first occurrence of a cell match counter not having incremented its count is at cell match counter 410A3. This would indicate that the fault which caused the diagnostic cell 412A to be lost is located in the region preceding that cell match counter $410A_3$ and following cell match counter $410A_2$. This suggests that the FIC 208A corrupts the diagnostic cell 412A. As will be appreciated, this isolation of the fault to one of all possible links and components along diagnostic cell datapath 402A reduces the time and effort required to correct the fault and to bring the corresponding datapath back to a full service level.

Upon isolating the suspected fault location, process 400B proceeds to block 438 at which an operator (positioned at, say, the monitor 110 as shown in FIG. 1B) is notified of the suspected location of the fault. Based on this information, the operator can proceed to replace one or more of the FRUs to correct the fault. At this point, the diagnostic process 400B may proceed to block 440 and end.

It will be appreciated that process 400B may be handled as a number of sub-processes. For example, block 428 may be executed as a sub-process at each diagnostic cell match counter $410A_1 \ldots 410A_5$, with each sub-process responsible for incrementing a count if the cell match counter $410A_1 \ldots 410A_5$ matches the diagnostic cell 412A as it passes by. In this case, the main process 400B need merely to wait for the timeout interval to expire at decision block 430 before proceeding further with polling the cell match counters $410A_1 \ldots 410A_5$ and analyzing the count values.

If the operator chooses to do so, the operator may conduct a further diagnostic test on the second diagnostic cell datapath 402B, sending another diagnostic cell 412B in the opposite direction through the various links and components. Such a further diagnostic test would generally follow the steps as described above for process 400B with necessary changes in points of detail, and may provide the operator with the location of an additional fault in a link or a component that was not located by the first diagnostic process 400B. The further diagnostic test through diagnostic cell datapath 402B may also provide additional information which may be used together with the information from the first test to isolate a faulty link or component. A further example of this concept is provided in greater detail with reference to FIG. 6, below.

In another embodiment, more than one diagnostic cell 412A may be inserted into the insertion point 414 so that each cell match counter $410A_1 \ldots 410A_5$ increments its count for each detected diagnostic cell 412. Each diagnostic cell 412A may be allowed sufficient time to traverse the links and components before the next diagnostic cell 412A is inserted at insertion point 414. This embodiment may be useful where, for example, a fault occurs intermittently, and it is not likely that a single iteration of a single diagnostic cell 412A is likely to identify the fault. Inserting multiple diagnostic cells 412A one after the other provides a greater likelihood that the intermittent fault will occur as one of the diagnostic cells 412A traverses the links and components. This concept is described in further detail with reference to FIG. 5C, below. (Thus, it will be understood that the process of FIG. 4B can be considered a subset of the process in FIG. 5C.)

Example 2

Non-Disruptive Bounce-back Fault Isolation Test

Figure 5A:
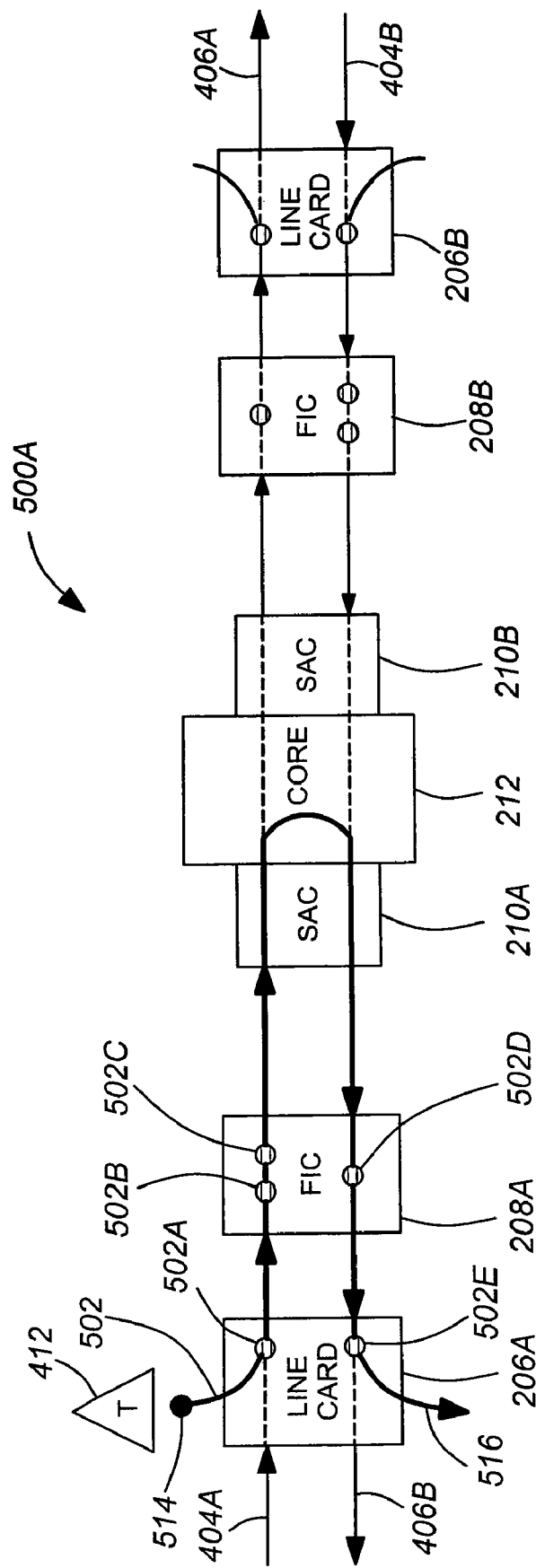
FIG. 5A is a block diagram of a non-disruptive bounce-back fault isolation test for testing the components in FIG. 2 in accordance with another embodiment.

Now referring to FIG. 5A, another embodiment of the method and system in accordance with the invention is shown and generally referred to by reference numeral 500A. In this "bounce-back" embodiment, a diagnostic cell datapath 502 starts at line card 206A, passes through the FIC 208A and the SAC 210A, enters core 212, returns through the SAC 210A and FIC 208A, and finally back to line card 206A. Hence, a test cell inserted into the diagnostic cell datapath 502 at line card 206A is "bounced back" by the switching core 212 to the same line card 206A. Thus, the cell insertion point 514 and the cell extraction point 516 of datapath 502 are both located in the line card 206A. It will be appreciated, however, that only the diagnostic cell is "bounced-back" and that other data traffic is not affected. Thus, other data traffic can flow normally through the switching core 212 and to various line cards (FIG. 2A).

In an embodiment, although not necessary for operation, the bounce-back path in the embodiment (defined by a VPI/VCI, for example) may be dedicated for the diagnostic cell 412 only, and data traffic is not carried on it. Thus, like the endpoint-to-endpoint fault isolation test described above (FIG. 4), this bounce-back fault isolation test may also be characterized as a non-disruptive test. This bounce-back fault isolation test embodiment may be used separately from, or in conjunction with, the endpoint-to-endpoint fault isolation test embodiment described above.

Still referring to FIG. 5A, shown at various locations along the datapath 502 are cell match counters 502a . . . 502e. A first cell match counter 502a is located near the insertion point 514 and sees the diagnostic cell 412 as it is inserted into the datapath 502. As in the earlier examples, recognition of a diagnostic cell 412 by the cell match counter 502a triggers an increment of a count. Other cell match counters 502b, 502c and 502d are all shown located on the FIC 208A proximate to the FIC 208A input port in the ingress direction, output port in the ingress direction and proximate to the FIC 208A input port in the return path egress direction. As suggested earlier, increasing the number of cell match counters may provide a better resolution in isolating a fault to a particular link or component. In this example, any one of these additional cell match counters 502b, 502c and 502d may fail to trigger a count, suggesting a fault in one or more regions of the FIC 208A, or possibly the SAC 210A or switching core 212. Finally, the last cell match counter 502e is located near the cell extraction point 516 and records a count as the diagnostic cell 412 is extracted from the datapath 502.

Figure 5B:
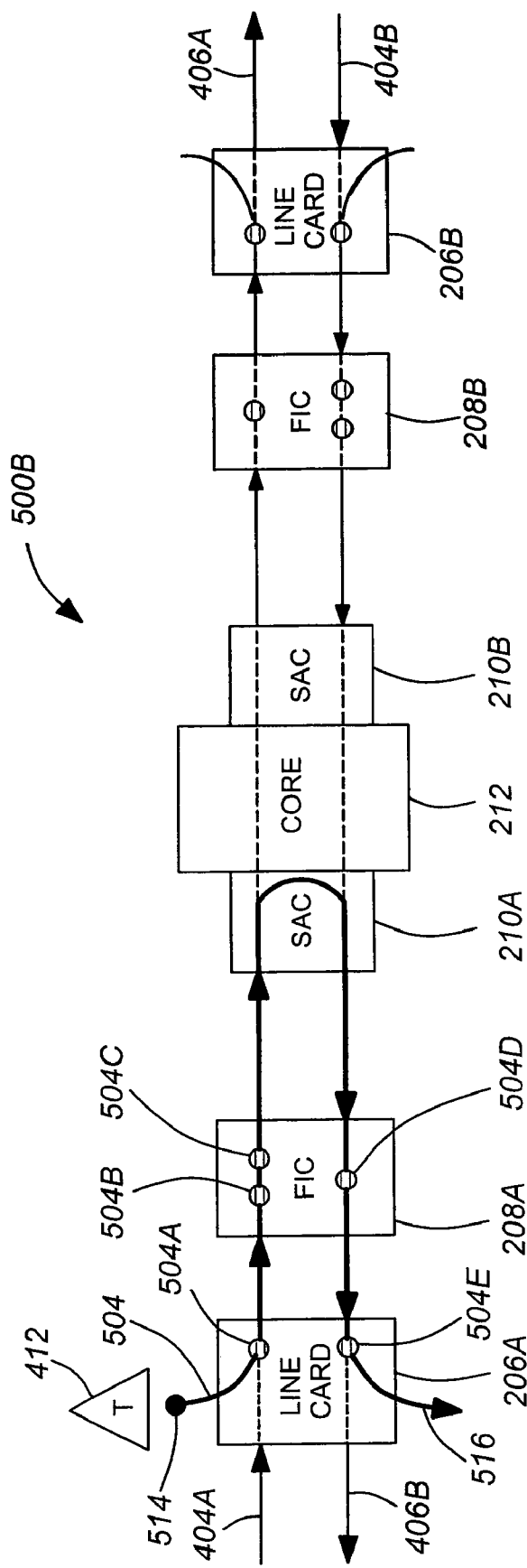
FIG. 5B is a block diagram of a non-disruptive bounce-back fault isolation test for testing the components on FIG. 2 in accordance with yet another embodiment.

Now referring to FIG. 5B, shown and generally referred to by reference numeral 500B is an alternative embodiment in which the diagnostic cell datapath 504 is bounced back at the SAC 210A. The cell insertion point 514 and the cell extraction point 516 are both located in the line card 206A, as in the previous embodiment in FIG. 5A. Located along the length of the datapath 504 are the same number of cell match counters 504a . . . 504e which are located in the line card 206A and the FIC 208A as shown in FIG. 5B. In particular, cell match counters 504c and 504d are located in the vicinity at the edge of the port of the turning point of the datapath 504 on the SAC 210A. This allows the switching core 212 to be excluded from the diagnostic cell datapath 504 for testing purposes. As the SAC 210A is not normally a returning point for data traffic originating from and destined back to the line card 206, it will be appreciated that bouncing back a diagnostic cell 412 at the SAC 210A will require a return path to be configured and provided at the SAC 210A.

In either of the embodiments shown in FIGS. 5A and 5B, the diagnostic process proceeds in a similar fashion, as described below.

Figure 5C:
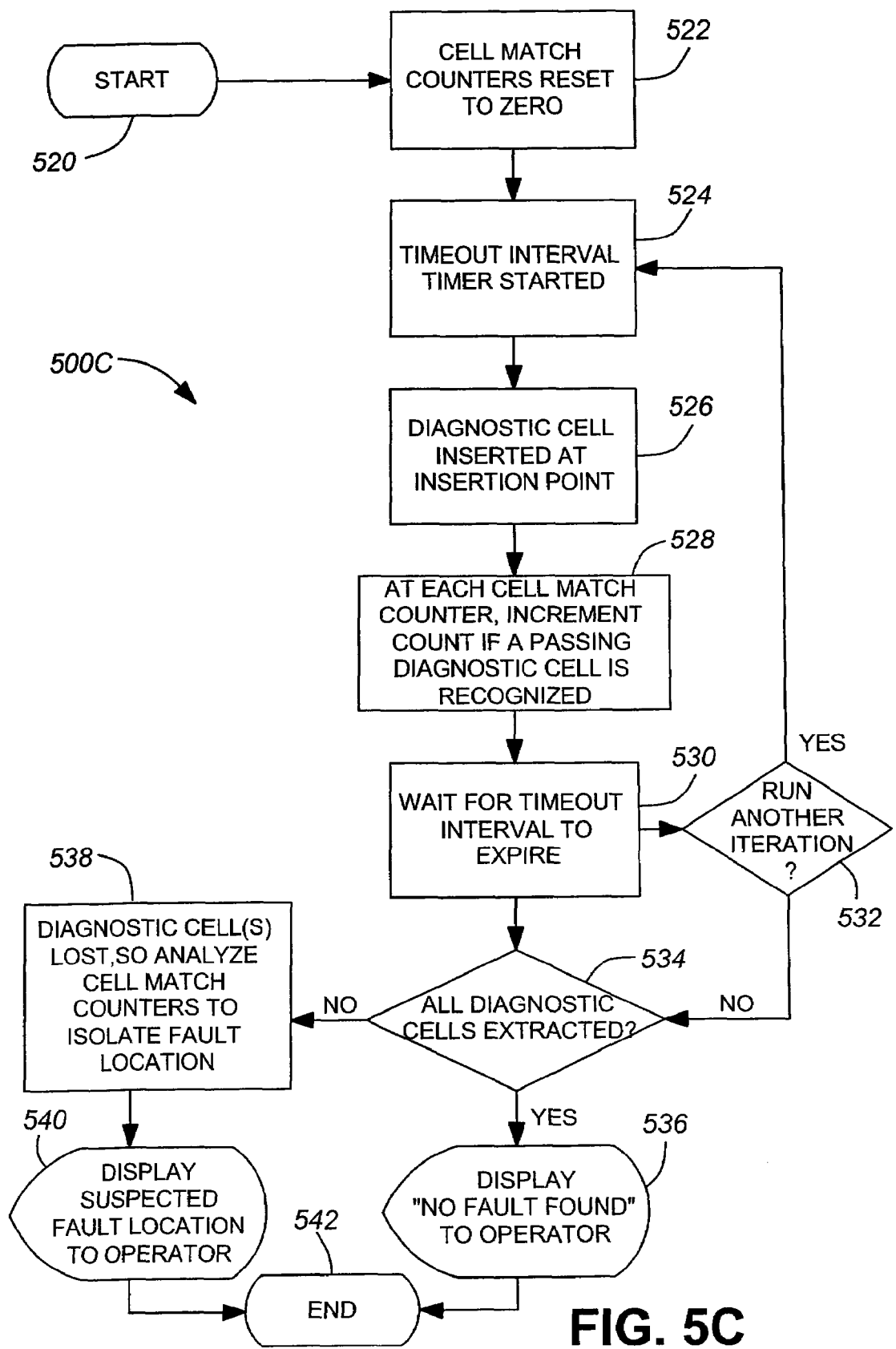
FIG. 5C is a flow chart of a process corresponding to the non-disruptive bounce-back fault isolation tests of FIGS. 5A and 5B.

Now referring to FIG. 5C, generally referred to by reference numeral 500C is a "multiple iteration" process for use with one of the configurations shown in FIGS. 5A and 5B. (It will be appreciated that, in an alternative embodiment, a similar "multiple iteration" process is possible for the configuration shown in FIG. 4A as well, with appropriate changes in points of detail.) Similar to the process 400B shown in FIG. 4B, the diagnostic process 500C starts at block 520 and proceeds to block 522 where the process 500C resets all cell match counters 502a . . . 502e, 504a . . . 504e to zero.

The process 500C then proceeds to block 524 at which a timer is started to measure a predetermined timeout interval T. Process 500C then proceeds to block 426. At block 526, contemporaneously with the starting of a timer at block 524, a diagnostic cell 412 is inserted into a cell insertion point 514, as shown in both FIGS. 5A and 5B. The timeout interval T is set to be somewhat longer than the time expected for the diagnostic cell 412 to traverse the diagnostic cell datapath 502, 504 and be extracted from the cell extraction point 516 at line card 206A.

The process 500C then proceeds to block 528 where cell match counters 502a . . . 502e, 504a . . . 504e in the diagnostic cell datapath 502, 504 wait for the diagnostic cell 412 to be detected, and if detected then to increment their counters. Once the timeout interval expires at block 530, the process 500C proceeds to decision block 532 at which the process 500C determines whether it will run another iteration. If so, the process 500C returns to block 524 where another timeout interval is started. Then, at block 526, another diagnostic cell 412 is inserted at insertion point 514.

If only a single iteration is run, the process 500C is substantially similar to process 400B described earlier. Process 500C determines, at decision block 534, whether the inserted diagnostic cell 412 has been successfully extracted at diagnostic cell extraction point 514. If so, process 500 proceeds to block 536 at which process 500C notifies the operator that no fault was found. Process 500C then proceeds to block 542 and ends.

If the diagnostic cell 412 has not been successfully extracted before expiration of the timeout interval T at block 530, then process 500C proceeds to block 538 at which process 500C analyses the cell match counters 502a . . . 502e, 504a . . . 504e in order to isolate the suspected fault location. Process 500C then proceeds to block 540 at which process 500C displays the suspected fault location to an operator. Process 500 then proceeds to block 542 and ends.

If multiple iterations of diagnostic test are to be run, then the process 500C proceeds from decision block 532 and returns to block 524 where another timeout interval T is started. Then, at block 526, another diagnostic cell is inserted at the cell insertion point 514. As noted earlier, multiple iterations of the diagnostic test may be useful where a fault is intermittent. From block 526, process 500 repeats the steps at blocks 528, 530 and 532 until no further iterations are to be run.

If no further iterations are to be run, process 500C proceeds to decision block 534 at which the process 500C determines whether all diagnostic cells inserted at block 524 have been successfully extracted. If so, then process 500C proceeds to block 536 as described above. If all diagnostic cells 412 inserted at block 526 have not been successfully extracted, then process 500C proceeds to block 538 where process 500C determines whether any of the cell match counters 502a . . . 502e, 504a . . . 504e have a low count relative to the number of diagnostic cells 412 inserted at block 526. Any such cell match counter 502a . . . 502e, 504a . . . 504e having less than the full count is indicative of a fault that has caused one or more diagnostic cells 412 to be lost at some point upstream from the location of the cell match counter 502a . . . 502e, 504a . . . 504e. Thus, the transition point between cell match counters 502a . . . 502e, 504a . . . 504e having a full count, and cell match counters 502a . . . 502e, 504a . . . 504e having a low count, is indicative of a fault near that location.

Thus, based on the cell count information, and the location of the cell match counters 502a . . . 502e, 504a . . . 504e, it will be appreciated that it is possible to isolate suspected fault locations within the diagnostic cell datapaths 502, 504, and within the corresponding links and components. As noted for the earlier example, this isolation of a fault, or an intermittent fault, to possibly one link and/or one component within a communications device significantly reduces the time and effort required to correct the fault in that device. Using this information, an operator can take steps to replace the suspected FRU or FRUs to correct the fault.

It will be appreciated that a similar test may be conducted to the other part of embodiment 500B, by utilizing a corresponding diagnostic cell datapath (not shown) through line card 206B, FIC 208B, and SAC 210B.

In a variation of the above described embodiment, rather than arbitrarily setting the number of iterations to run the process 500C, it is possible to run multiple iterations until an inserted diagnostic cell 412 is not successfully extracted from the diagnostic cell extraction point 516 before expiration of the timeout interval T. This embodiment maybe useful where the time between intermittent faults is unpredictable. Such a process could be stopped manually if the tests are successful for a long duration of time.

Figure 6:
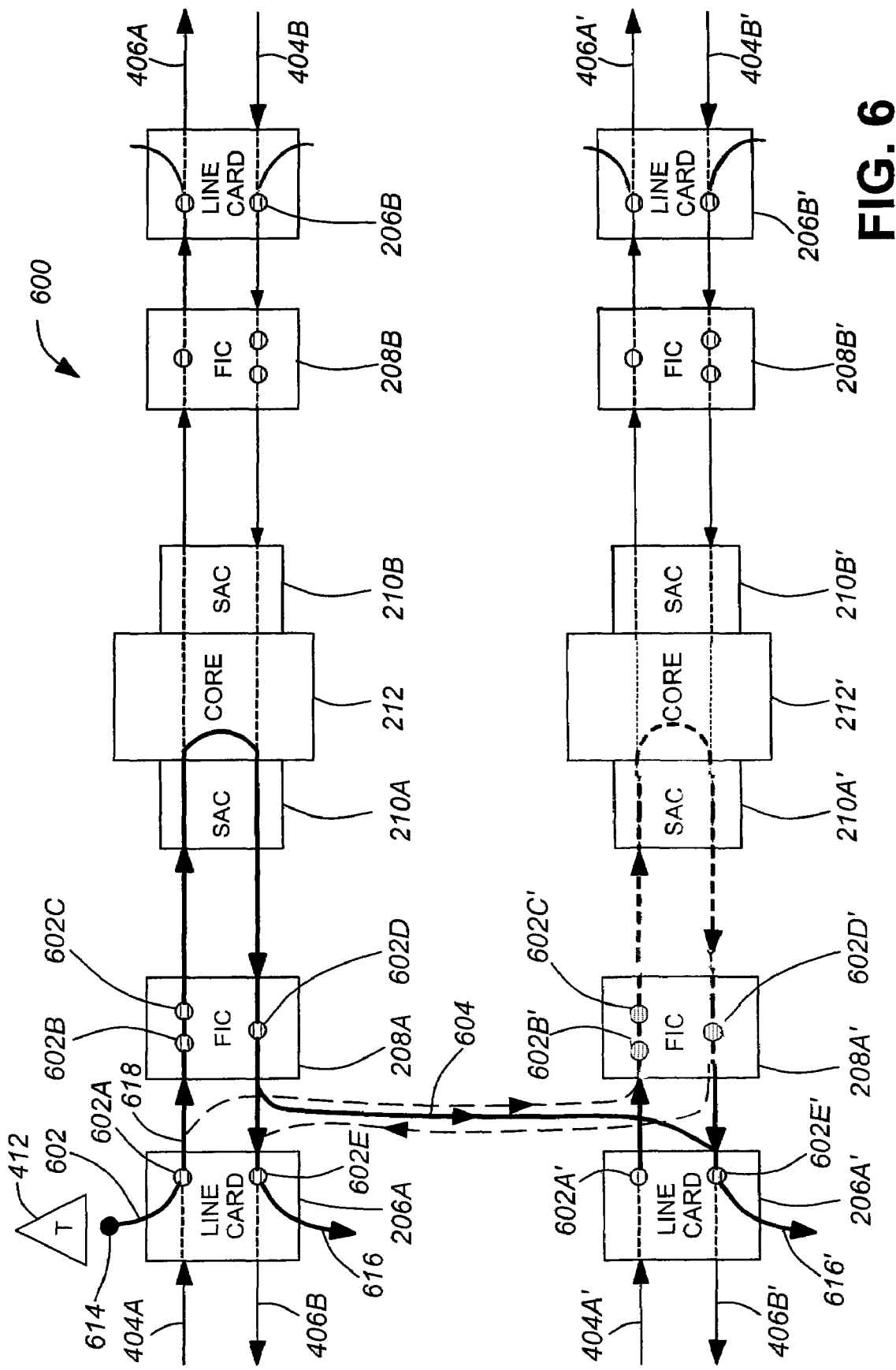
FIG. 6 is a block diagram of a redundant datapath non-disruptive bounce-back fault isolation test for testing the components in FIG. 2 and a redundant set of components in accordance with yet another embodiment.

Now referring to FIG. 6, another embodiment is shown and generally referred to by reference numeral 600. Diagnostic cell datapath 602 shown in a bounce-back configuration in the upper portion of FIG. 6 is substantially analogous to the bounce-back configuration shown in FIG. 5B, except that the bounce-back occurs in the switching core 212. Similar to the diagnostic cell datapath 504, the bounce-back in datapath 602 only affects the diagnostic cell 412, and does not affect data traffic entering line card 206A from link 404A and passing through to the switching core 212 to SAC 210B, FIC 208B, and line card 206B, etc. While the diagnostic cell datapath 602 does not affect data traffic passing through the switching core 212, it is possible that the data traffic itself may be processed in the switching core 212 and returned through line card 206A and out through link 406B. Thus, again, the bounce-back fault isolation test shown in FIG. 6 may be characterized as being a non-disruptive test.

As shown in FIG. 6, cell match counters 602a . . . 602e are located at various locations along the length of the datapath 602. The process for performing the bounce-back test on diagnostic cell datapath 602 is substantially the same as the process for diagnostic cell datapath 504, as described above, with necessary changes in points of detail.

Still referring to FIG. 6, in the lower half of the drawing, a redundant set of line cards 206A', 206B', FICs 208A', 208B', SACs 210A', 210B' and a switching core 212' is shown in an identical configuration to that shown in the upper half of the drawing. This configuration may be found, for example, in a switching node 106A (FIG. 1B) which has redundant datapaths or fabrics for higher system availability. That is to say, data traffic passing through the switching node 106A may be switched from an active datapath (i.e. the upper half of FIG. 6) to a redundant datapath (i.e. the lower half of FIG. 6) in the event of a fault. A diagnostic cell 412 may take an alternate exit 604 through the redundant line card 206A' before being extracted from cell extraction point 616'.

Still referring to FIG. 6, another diagnostic cell datapath 602' is shown as a bold, dashed line beginning at cell insertion point 614, passing into line card 206A, passing into the redundant FIC 208A', then the redundant SAC 210A', and back again through line card 206A. The diagnostic cell 412 may pass through an alternate exit 604' through card 206A' and be extracted at extraction point 616'.

The embodiment shown in FIG. 6 comprises a two-part diagnostic test which may provide better resolution in isolating a fault. For example, if a diagnostic test through the first diagnostic test datapath 602 results in cell match counters 602b . . . 602e not incrementing, then the diagnostic cell 412 may be lost somewhere between the line card 206A and the FIC 208A. More specifically, the point of failure could be the line card 206A transmission interface, the FIC 208A receive interface, or the LFI 618 between the two.

In an embodiment, a diagnostic cell inserted at insertion point 614 is broadcast to both fabrics (i.e. the upper and lower portions of FIG. 6) at the same time. By examining the results in cell match counters 602b' . . . 602e', it is possible to infer whether the FIC 208A or the LFI 618 is the likely point of failure. For example, if for the second test, counter 602b' is correctly incremented, therefore receiving the diagnostic cell 412, then it is known that line card 206A, link 618' and FIC 208A' are operating properly. Comparing the status of these components with the active datapath indicates that the failure may be in datapath 618 or FIC 208A but not in line card 206A. If counter 602b' is not correctly incremented, then comparing the status of those components in the active datapath indicates that the failure may be in datapath 618 or line card 206A, but not likely in FIC 208A.

As will be appreciated, the roles could be reversed if the redundant datapath becomes the active datapath, and the formerly active datapath becomes the new redundant datapath. The process for performing diagnostic tests on the configuration shown in FIG. 6 is substantially analogous to that described for FIG. 5B, with necessarily changes in points of detail.

In an alternative embodiment, as part of the analysis of cell match counters as conducted in any of the processes described above, it is possible to utilize a fault isolation lookup table that has been created for a particular configuration. Now referring to FIG. 7, an example of a lookup table 700 for a configuration containing, say, seven cell match counters 702a . . . 702g is shown. FIG. 7 provides possible outcomes of cell count values for a single iteration diagnostic test using a single diagnostic cell 412. As shown in FIG. 7, the rows 704a . . . 704h of table 700 provide possible outcomes 706 of the diagnostic test based on which of the cell match counters 702a . . . 702g have incremented a count. (In FIG. 7, by way of example, 1 indicates a correct count and a 0 indicates an incorrect/unexpected count.) For each possible outcome 706, as explained earlier, the transition point between a cell match counter 702a . . . 702g having a full count, and a cell match counter 702a . . . 702g having no count (or a low count) is of particular significance, and indicates that there is a fault located somewhere between the two. Thus, the table 700 can store a list of suspected links or components 708, based on the location of the cell match counters 702a . . . 702g in the diagnostic cell datapath (not shown). A similar lookup table may be developed based on a particular configuration to automate the analysis process, for example in block 436 (FIG. 4B) and in block 538 (FIG. 5C), and provide the operator with a particular fault location, or a short list of suspected fault locations, as the case may be.

H. Disruptive Fault Isolation Tests

The above examples described a non-disruptive fault isolation tests where data traffic is allowed to continue to flow through a communications device being tested. A non-disruptive test is preferable when it can provide sufficient information to isolate a fault location in a communications device. However, in some situations, it may be necessary to conduct a disruptive test in which data traffic flowing through a communications device is disrupted, as described below.

EXAMPLE

Figure 8A:
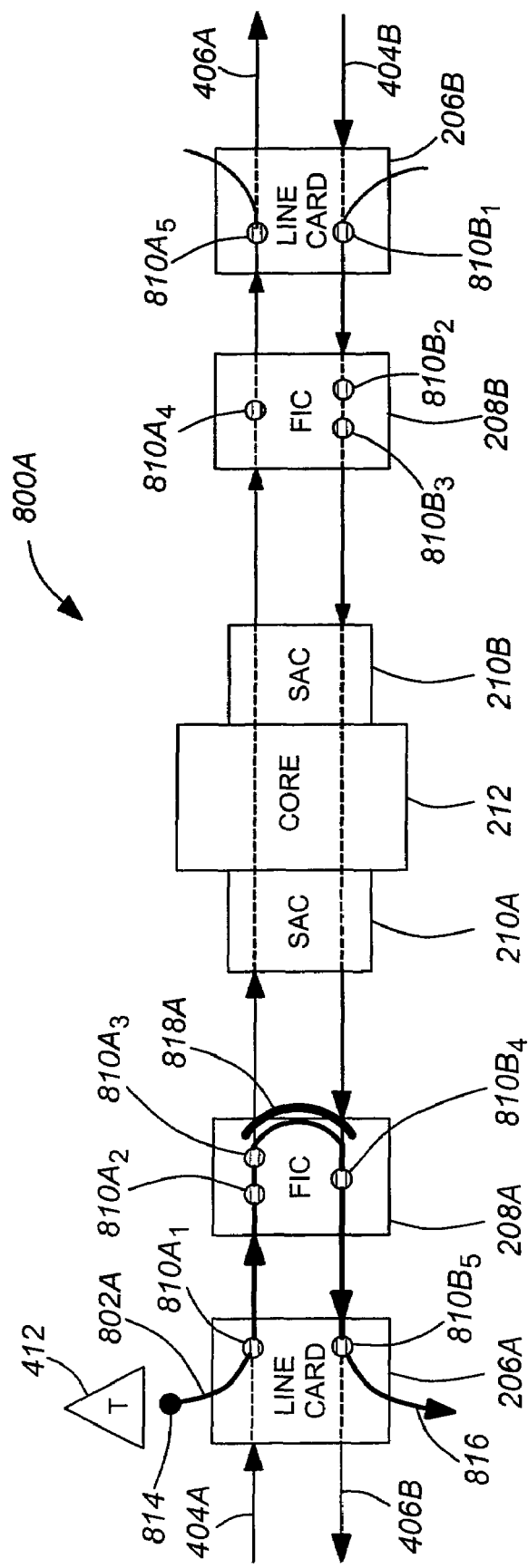
FIG. 8A is a block diagram showing a disruptive loop-back fault isolation test for testing various components in FIG. 2 in accordance with an embodiment.

Referring to FIG. 8A, shown and generally referred to by reference numeral 800A are various components of FIG. 2, with a loop-back fault isolation test being conducted on some of the components in accordance with an embodiment. More specifically, a diagnostic cell datapath 802A is shown passing through diagnostic cell match counters $810A_1$, $810A_2$, $810A_3$, $810B_4$, and $810B_5$ in line card 206A and the FIC 208A. In an embodiment, the diagnostic cell datapath 802A may be defined by a particular VPI/VCI connection which is dedicated to the diagnostic function and unavailable for other traffic. However, in other embodiments, it is not necessary to provide a dedicated diagnostic cell datapath as long as a diagnostic cell/packet/frame can be readily distinguished from other data traffic (for example by utilizing a unique header or label).

As will be appreciated, in a disruptive test, it is no longer necessary to be concerned about the impact of the testing on other data traffic being sent over the same datapath being tested. Rather, it would be possible to perform a more robust set of tests by using, for example, a spectrum of diagnostic cells having different headers or labels. Also, it would be possible to conduct testing at traffic volumes that are more reflective of actual data traffic. Furthermore, it would be possible to test any one of a number of specified paths (identified by a VPI/VCI, for example) which may be causing errors to occur. Generally speaking, a disruptive test may provide a better likelihood of identifying an intermittent or elusive problem by being able to test a broader range of connections at a significantly increased testing rate. Furthermore, with a disruptive test, it is possible to conduct extensive diagnostics on even a partially functioning components and devices which are incapable of performing a "bounce-back" as described for the non-disruptive tests above.

Still referring to FIG. 8A, the diagnostic cell datapath 802A coincides with a segment of a first datapath which starts at ingress communication link 404A and ends at egress communication link 406A, and a short segment of a second datapath which starts at ingress communication link 404B and ends at egress communication link 406B. As shown, the diagnostic cell datapath 802A loops back within the FIC 208A immediately downstream from diagnostic cell match counter 810A3 and immediately upstream from diagnostic cell match counter 810B4. The loop-back may be achieved, for example, by engaging a loop-back system 818A. In a preferred embodiment, the loop-back system 818A can be readily engaged and disengaged on command and may perform a mechanical redirection of the signal (which may be electrical, for example) near the vicinity of the output port of FIC 208A back into the FIC 208A. This may be done, for example, by making an appropriate connection between channels within the FIC 208A, as shown in FIG. 8A. Accordingly, all VPI/VCIs in a channel associated with that redirected channel or link will have their data "looped-back" to the line card 206A, thereby disrupting the traffic flow of the entire channel. Each VPI/VCI in the channel may use different internal circuits (e.g. queues) along the collective datapath. The embodiment allows the selection of any VPI/VCI as being the tested datapath during a disruptive loop-back test. This set of tests may provide better coverage of faults over the testing of a single VPI/VCI channel as described earlier for a "bounce-back" test (FIGS. 4A . . . 5B, above). It will be appreciated that other collective datapaths, not necessarily defined by a VPI/VCI, may also be tested in a similar manner.

Still referring to FIG. 8A, in operation, a diagnostic cell 412 is inserted into the diagnostic cell datapath 802A at a diagnostic cell insertion point 814. In normal operation, if the line card 206A and the FIC 208A are functioning properly, the diagnostic cell 412 passes through the diagnostic cell datapath 802A and is extracted at diagnostic cell extraction point 816.

Significantly, the loop-back system 818A within FIC 208A returns both the diagnostic cell 412 passing through the diagnostic cell datapath 802A and any data traffic passing through the coinciding datapath 404A . . . 406A. Thus, this loop-back test is disruptive while the loop-back system 818A is engaged. Various other diagnostic cell match counters 810A4 . . . 810A5, 810B1 . . . 810B3 are shown in FIG. 8A but do not participate in the disruptive loop-back test conducted on the diagnostic cell datapath 802A.

Still referring to FIG. 8A, shown at various locations along the diagnostic cell datapath 802A are cell match counters 810A1, 810A2, 810A3, 810B4, and 810B5. The first cell match counter 810A1 is located near the insertion point 814 and sees the diagnostic cell 412 as it is inserted into the datapath 802A. Recognition of a diagnostic cell 412 by the cell match counter 810A1 triggers an increment of a count. Other cell match counters 810A2, 810A3 and 810B4 located along the datapath wait for the diagnostic cell 412 to pass by and increment their counts in response. The last cell match counter 810B5 is located near the cell extraction point 416 and increments a count as the diagnostic cell 412 is extracted from the datapath 802a.

If, however, the diagnostic cell 412 is lost or otherwise corrupted as it travels along the datapath 802A, one or more of the cell match counters 810A1, 810A2, 810A3, 810B4, and 810B5 may not increment their counts. For example, if diagnostic cell match counter 810A3 increments a count but diagnostic cell match counter 810B4 fails to increment a count, it can be inferred that the diagnostic cell 412 was lost or otherwise corrupted along the diagnostic cell datapath 802A somewhere between cell match counter 810A3 and cell match counter 810B4. This information can be used by a process, as described further below, to isolate the fault to a specific location in the FIC 208. In the event of such a fault isolation, the entire FIC 208A would likely be replaced as a FRU.

While five diagnostic cell match counters 810A1, 810A2, 810A3, 810B4, and 810B5 are shown along diagnostic cell datapath 802A by way of example, it will be appreciated that increasing the number of cell match counters along the datapath 802A may provide better resolution in isolating a fault to a particular FRU. However, it will also be appreciated that, beyond a certain number of cell match counters saturating strategic locations within a component (e.g. at both input and output ports of the components both in the ingress and egress directions), additional cell match counters may not add any significant resolution.

Figure 8B:
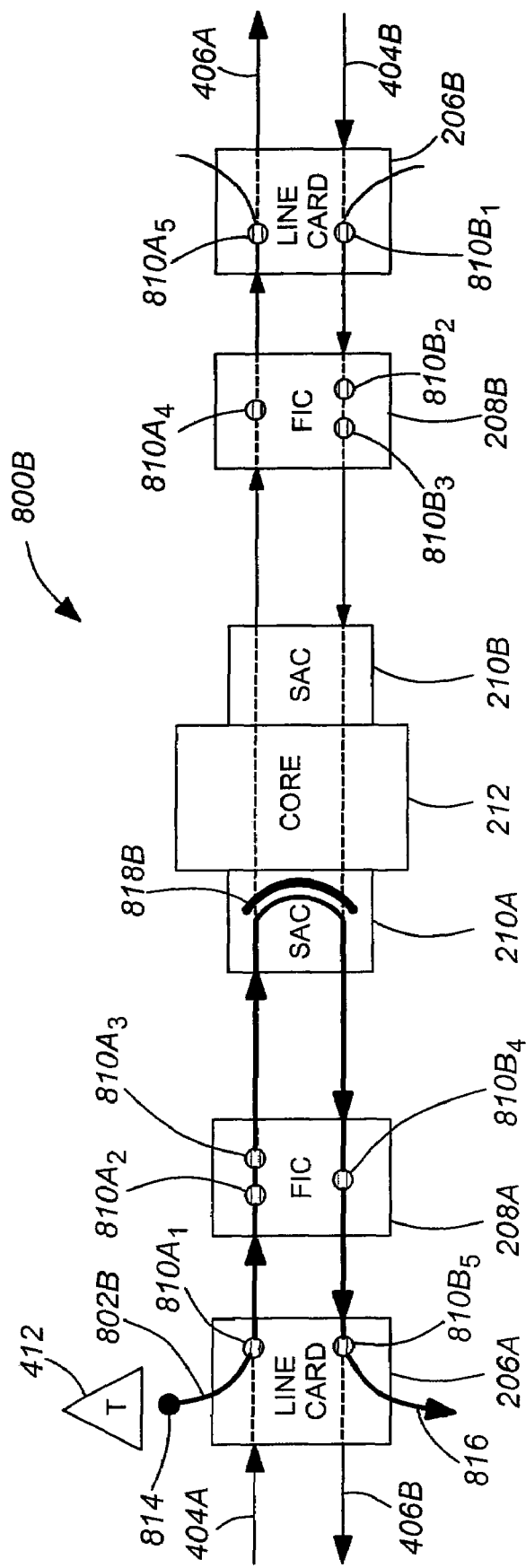
FIG. 8B is a block diagram showing another disruptive loop-back isolation test for testing various other components in FIG. 2 in accordance with an embodiment.

Now referring to FIG. 8B, shown and generally referred to by reference numeral 800B is a second disruptive loop-back test through diagnostic cell datapath 802B with a loop-back at the SAC 210A.

The second loop-back test may be conducted in order to test a longer segment of the datapaths 404A . . . 406A, 404B . . . 406B. More specifically, the diagnostic cell datapath 802B is extended and loops back at the SAC 210A rather than the FIC 208A. Again, the loop-back may be achieved by engaging a loop-back system 818B located on the SAC 210A which directs the diagnostic cell datapath 802B and any ingress data traffic coming in through link 404A onto the egress portion of datapath 404B . . . 406B. The loop-back system 818B may be readily engaged and disengaged for performing the loop-back test along diagnostic cell datapath 802B.

As in FIG. 8A, a plurality of diagnostic cell match counters 810A1, 810A2, 810A3, 810B4, and 810B5 are located along the diagnostic cell datapath 802B. As diagnostic cell datapath 802B is extended and looped back at the SAC 210A rather than at the FIC 208A (FIG. 8A), it will be appreciated that the SAC 210A is added as a tested component in the loop-back isolation test. Thus, even if the first loop-back test using diagnostic cell datapath 802A (FIG. 8A) was successful, a second loop-back test using diagnostic cell datapath 802B may fail. This would indicate that there is a fault within the SAC 210A or possibly in the links 817, 819 connecting the FIC 208A and the SAC 210A.

Still referring to FIG. 8B, other diagnostic cell match counters 810A4, 810A9, and 810B1 . . . 810B5 do not participate in the second loop-back test. Also, it will be appreciated that additional cell match counters (not shown) may be added to the SAC 210A to provide additional resolution in isolating a fault along the diagnostic cell datapath 802B.

Figure 8C:
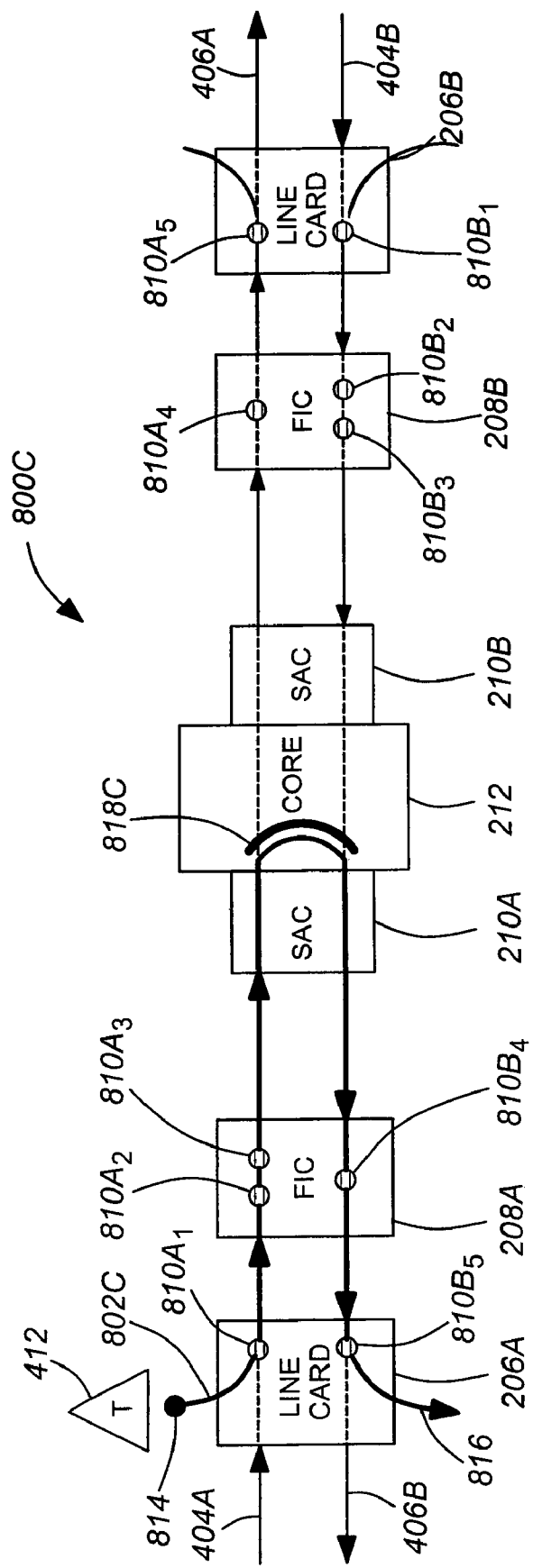
FIG. 8C is a block diagram showing yet another disruptive loop-back isolation test for testing yet other components in FIG. 2 in accordance with an embodiment.

Now referring to FIG. 8C, generally referred to by reference numeral 800C is a third loop-back test along diagnostic cell datapath 802C. Depending on the FRU, it may or may not be possible to provide a loop-back system. However, in order to illustrate how multiple iterative loop-back tests can be conducted on successively linked components or FRUs, it is assumed for the purposes of this example that a loop-back system similar to the loop-back systems 818A and 818B in FIGS. 8A and 8B is available for the switching core 212.

As shown, the diagnostic cell datapath 802C has been extended even further and now loops back within the core 212. The extended datapath 802C brings both the SAC 210A and the switching core 212 into the loop-back test on the diagnostic cell datapath 802C and provides additional information on isolating a fault location. For example, if the second loop-back test along diagnostic cell datapath 802B was successful but a subsequent loop-back test on diagnostic cell datapath 802C fails, then it can be inferred that the fault location is either in the switching core 212, or at one of the communications ports connecting the SAC 210A to the switching core 212. The plurality of diagnostic cell match counters $810A_1$, $810A_2$, $810A_3$, $810B_4$, and $810B_5$ located along the diagnostic cell datapath 802C provide additional information on the suspected location of a fault.

It will be appreciated that the three loop-back tests as shown in FIGS. 8A . . . 8C may be conducted in sequence to isolate a fault location in a segment of one of the datapaths 404A . . . 406A, 404B . . . 406B. An illustrative example of a process for conducting a sequence of loop back tests using the configurations in FIGS. 8A . . . 8C is now shown and described in FIG. 9.

Figure 9:
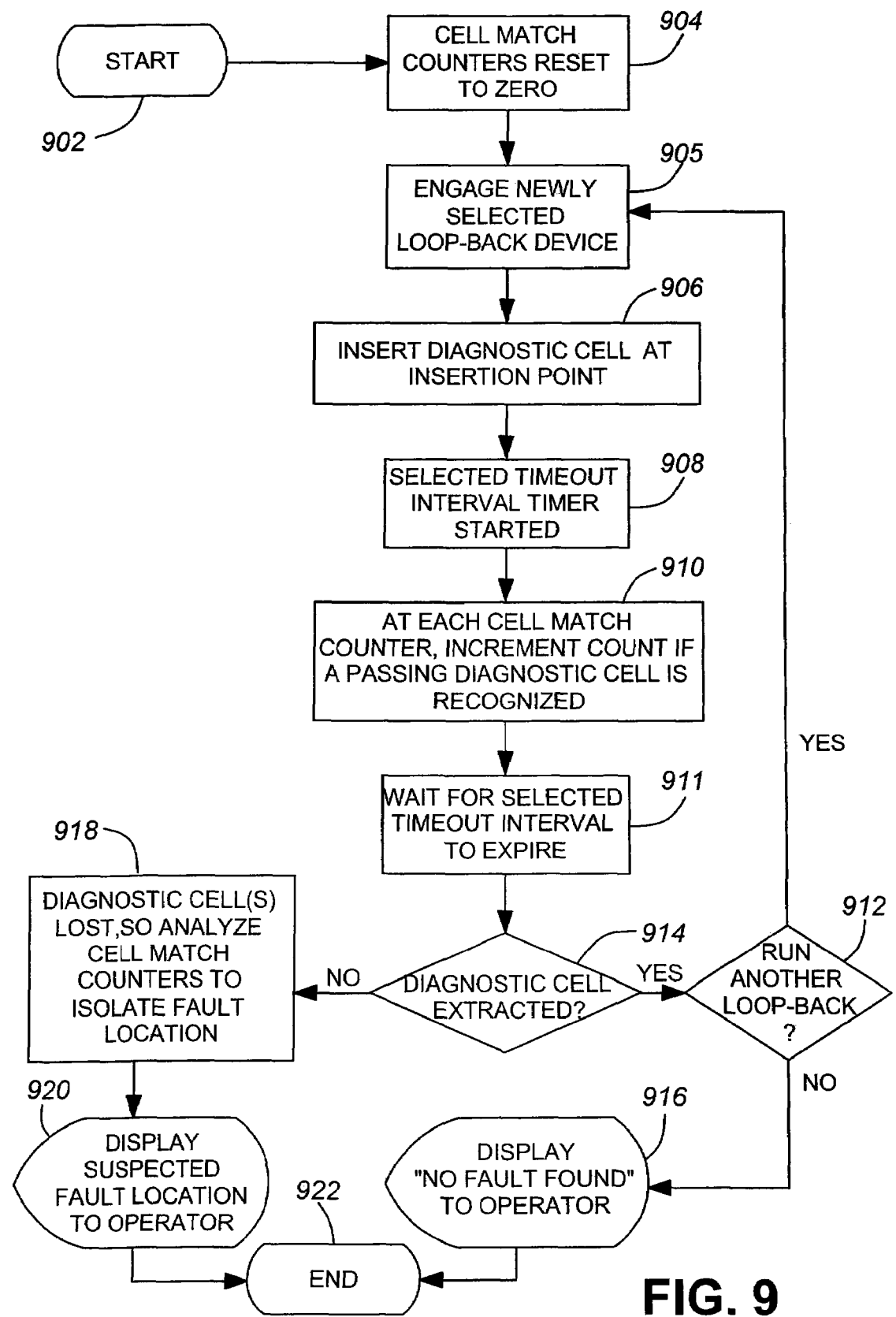
FIG. 9 is a flowchart of a process corresponding to the disruptive loop-back isolation test of FIGS. 8A, 8B and 8C.

In FIG. 9, process 900 begins at block 902 and proceeds to block 904 at which the process 900 resets all cell match counters to zero. In FIG. 8A, for example, diagnostic cell match counters $810A_1$ . . . $810A_5$, $810B_1$ . . . $810B_5$ are reset to zero (alternatively, just the diagnostic cell match counters located on the diagnostic cell datapaths 802A, 802B, 802C—namely counters $810A_1$, $810A_2$, $810A_3$, $810B_4$, and $810B_5$—may be reset).

The process 900 then proceeds to block 905 at which a selected loop-back system is engaged to establish the loop-back. For example, in FIG. 8A, the loop-back system 818A would be engaged.

The process 900 then proceeds to block 906 at which a diagnostic cell 412 is inserted into a cell insertion point 414, as shown in FIG. 8A. Contemporaneously with the insertion of a diagnostic cell 412, a timer is started at block 908 to measure a predetermined timeout interval T1. (It will be appreciated that the blocks 906 and 908 may be shown in exchanged positions, as in FIG. 4B above.) The timeout interval T1 is set to be somewhat longer than the time expected for the diagnostic cell 412 to traverse the diagnostic cell datapath 902A and be extracted from the cell extraction point 816 at line card 206A (FIG. 8A).

The process 900 then proceeds to block 910 where diagnostic cell match counters $810A_1$, $810A_2$, $810A_3$, $810B_4$, and $810B_5$ in the diagnostic cell datapath 802A wait for the diagnostic cell 412 to be detected, and if detected then to increment their counters. Once the timeout interval T1 expires at block 911, the process 900 proceeds to decision block 914 at which the process 900 queries whether all diagnostic cells have been extracted. If so, process 900 proceeds to decision block 912. If not, process 900 instead proceeds to block 918 at which the cell match counters $810A_1$, $810A_2$, $810A_3$, $810B_4$, and $810B_5$ are analyzed. It will be appreciated that a lookup table similar to lookup table 700 (FIG. 7) can be prepared to analyze the results of cell match counters $810A_1$, $810A_2$, $810A_3$, $810B_4$, and $810B_5$ after running the first loop-back test using diagnostic cell datapath 802A. From block 918, process 900 proceeds to block 920 at which the suspected fault location is displayed to the operator. Process 900 then proceeds to block 922 and ends.

At decision block 912, as the diagnostic cell 412 was not lost, process 900 can proceed with a second loop-back test using diagnostic cell datapath 802B as shown in FIG. 8B. Accordingly, process 900 returns to block 905 to engage a newly selected loop-back system 818B (FIG. 8B) and inserts a new diagnostic cell 412 at insertion point 814 (FIG. 8B).

The process 900 then proceeds to block 908 and a timer is started to measure another timeout interval T2. The timeout interval T2 is set to be somewhat longer than the time expected for the diagnostic cell 412 to traverse the diagnostic cell datapath 802B and be extracted from the cell extraction point 416 at line card 206A (FIG. 8B). As the diagnostic cell datapath 802B is somewhat longer than diagnostic cell datapath 802A, the timeout interval T2 may be set to be somewhat longer than timeout interval T1. However, in practice, the slightly longer distance likely will not significantly increase the time for the diagnostic cell 412 to traverse the diagnostic cell datapath 802B, and a common timeout interval, where T1=T2, may be used.

The process 900 then proceeds to block 910 where diagnostic cell match counters $810A_1$, $810A_2$, $810A_3$, $810B_4$, and $810B_5$ in the diagnostic cell datapath 802B again wait for the diagnostic cell 412 to be detected, and if detected then to increment their counters. While the same number of diagnostic cell match counters $810A_1$, $810A_2$, $810A_3$, $810B_4$, and $810B_5$ are used in the second loop-back test in this example, it will be appreciated that additional diagnostic cell match counters (not shown) may be added to the diagnostic cell datapath 802B in the extended portion of the datapath 802B (i.e. the extended portion of diagnostic cell datapath 802B looping back at SAC 210A). Such additional diagnostic cell match counters may provide increased resolution in isolating a fault location.

Once the timeout interval T2 expires at block 911, the process 900 proceeds again to decision block 914 at which the process 900 queries whether all diagnostic cells have been extracted. If so, process 900 proceeds to decision block 912. If not, process 900 instead proceeds to block 918 at which the cell match counters $810A_1$, $810A_2$, $810A_3$, $810B_4$, and $810B_5$ are analyzed. It will be appreciated that a lookup table similar to lookup table 700 (FIG. 7) can be prepared to analyze the results of cell match counters $810A_1$, $810A_2$, $810A_3$, $810B_4$, and $810B_5$ after running the second loop-back test using diagnostic cell datapath 802B. From block 918, process 900 proceeds to block 920 at which the suspected fault location is displayed to the operator. Process 900 then proceeds to block 922 and ends.

At decision block 912, as the diagnostic cell 412 was not lost during the second loop-back test, process 900 can proceed with a third loop-back test using diagnostic cell datapath 802C as shown in FIG. 8C. Accordingly, process 900 returns to block 905 to engage a newly selected loop-back system 818C (FIG. 8C) and inserts a new diagnostic cell 412 at insertion point 814 (FIG. 8C).

The process 900 then proceeds again to block 908 and a timer is started to measure another timeout interval T3. The timeout interval T3 is set to be somewhat longer than the time expected for the diagnostic cell 412 to traverse the diagnostic cell datapath 802C and be extracted from the cell extraction point 416 at line card 206A (FIG. 8C). As the diagnostic cell datapath 802C is somewhat longer than diagnostic cell datapath 802B, the timeout interval T3 may be set to be somewhat longer than timeout interval T2. However, in practice, the slightly longer distance likely will not significantly increase the time for the diagnostic cell 412 to traverse the diagnostic cell datapath 802B, and a common timeout interval, where T1=T2=T3, may be used.

The process 900 then proceeds to block 910 where diagnostic cell match counters 810A₁, 810A₂, 810A₃, 810B₄, and 810B₅ in the diagnostic cell datapath 802C again wait for the diagnostic cell 412 to be detected, and if detected then to increment their counters. While the same number of diagnostic cell match counters 810A₁, 810A₂, 810A₃, 810B₄, and 810B₅ are used in the third loop-back test in this example, it will be appreciated that additional diagnostic cell match counters (not shown) may be added to the diagnostic cell datapath 802C in the extended portion of the datapath 802C (i.e. the extended portion of diagnostic cell datapath 802C looping back at core 212). Such additional diagnostic cell match counters may provide increased resolution in isolating a fault location.

Once the timeout interval T3 expires at block 911, the process 900 proceeds again to decision block 914 at which the process 900 queries whether all diagnostic cells have been extracted. If so, process 900 proceeds to decision block 912. If not, process 900 instead proceeds to block 918 at which the cell match counters 810A₁, 810A₂, 810A₃, 810B₄, and 810B₅ are analyzed.

It will be appreciated that another lookup table similar to lookup table 700 (FIG. 7) can be prepared to analyze the results of cell match counters 810A₁, 810A₂, 810A₃, 810B₄, and 810B₅ after running the third loop-back test using diagnostic cell datapath 802C. From block 918, process 900 proceeds to block 920 at which the suspected fault location is displayed to the operator. Process 900 then proceeds to block 922 and ends.

At decision block 912, as the diagnostic cell 412 was not lost during the third loop-back test, and there are only three loop-back tests for this exemplary embodiment, all tests have been conducted and process 900 can proceed to block 916, at which process 900 can notify the operator that no fault has been found after the three loop-back tests.

Thus, based on the cell count information, and the location of the cell match counters 810A₁, 810A₂, 810A₃, 810B₄, and 810B₅, it will be appreciated that it is possible to isolate suspected fault locations within the diagnostic cell datapaths 802A, 802B, 802C, and within the corresponding links and components.

Significantly, the cumulative information gained from conducting a cumulative series of loop-back tests provides additional information which allows an operator to further isolate the location of a fault in the datapaths 804A . . . 806A, 804B . . . 806B. The step-by-step extension of the diagnostic cell datapaths 802A, 802B, 802C brings additional components into the loop-back test, one-by-one, in order to rule out possible fault locations in the datapaths 404A . . . 406A, 404B . . . 406B. In conjunction with an examination and analysis of the cell match counters 810A₁, 810A₂, 810A₃, 810B₄, and 810B₅, an operator can isolate a fault location to a specific FRU.

While three loop-back tests have been shown by way of example, it will be appreciated that even more loop-back tests may be conducted in sequence. By extending diagnostic cell datapaths even further than shown in FIG. 8C, it is possible to test even longer segments of the datapaths 404A . . . 406A, 404B . . . 406B. Furthermore, the cumulative information gained by the sequence of loop-back tests may assist in quickly isolating a fault location along the datapaths 404A . . . 406A, 404B . . . 406B.

In an alternative embodiment, it will be appreciated that the diagnostic cell datapaths 802A, 802B, 802C may start by extending through all components to be tested, then become progressively shorter and shorter with each loop-back test in the series excluding components to be tested, one-by-one. This approach will also provide cumulative information which, in conjunction with an analysis of the cell match counters 810A₁, 810A₂, 810A₃, 810B₄, and 810B₅ will allow an operator to positively identify a fault location to a specific FRU.

In yet another embodiment, as part of the analysis of cell match counters conducted in any of the processes described above, it is possible to utilize a fault isolation lookup table that has been created for a particular configuration.

In yet another embodiment, it will be appreciated that any of the various diagnostic tests described above may be used alone or in combination to isolate a fault location in a communications device, such as a routing switch.

It is noted that those skilled in the art will appreciate that various modifications of detail may be made to the present embodiment, all of which would come within the scope of the invention.

The invention claimed is:

1. A method of identifying a failure location in a datapath in a communication element, said datapath traversing from an ingress point through at least a first active component and at least a first inactive component to an egress point, said method comprising:
    inserting a diagnostic cell into said datapath at an insertion point upstream of said first active component in said datapath, wherein said diagnostic cell traverses said datapath through said first active component and into said first inactive component;
    increasing a first diagnostic cell match counter at a first location in said first inactive component, when said first diagnostic cell match counter recognizes that said diagnostic cell has passed said first location;
    analyzing the value of said first diagnostic cell match counter; and
    identifying said failure location in said datapath based on the value of said first diagnostic cell match counter.

2. The method of identifying a failure location in a datapath of claim 1, wherein said failure location is identified as being downstream of said first location when said first diagnostic cell match counter recognizes that said diagnostic cell passed said first location.

3. The method of identifying a failure location in a datapath of claim 2, wherein a second diagnostic cell match counter is increased at a second location in said datapath, when said second diagnostic cell match counter recognizes said diagnostic cell passing said second location.

4. The method of identifying a failure location in a datapath of claim 1, wherein:
    said datapath traverses an ingress line card, an inactive switching fabric, and an egress line card;
    said insertion point is upstream of said ingress line card; and
    said first inactive component is selected from one of said ingress line card and said egress line card.

5. The method of identifying a failure location in a datapath as claimed in claim 4, wherein said datapath is defined by a VPI/VCI connection, and passage of said diagnostic cell along the datapath is non-disruptive of regular data traffic passing through the communication element.

6. The method of identifying a failure location in a datapath of claim 1, wherein said datapath traverses an ingress line card and returns through said ingress line card.

7. The method of identifying a failure location in a datapath as claimed in claim 6, wherein said datapath is defined by a VPI/VCI connection, and passage of said diagnostic cell along the datapath is non-disruptive of regular data traffic passing through the communication element.

8. A system for identifying a failure location in a datapath in a communication element, said datapath traversing from an ingress point through at least a first active component and at least a first inactive component to an egress point, said system comprising:

at least a first diagnostic cell match counter associated with a first location in said first inactive component, said first diagnostic cell match counter recognizing when a diagnostic cell passes said first location and tracking passage of said diagnostic cell past said first location by increasing an internal count, wherein said diagnostic cell traverses said datapath through said first active component and into said first inactive component; and a diagnostic cell counter module for analyzing the internal count in said diagnostic cell match counter to identify said failure location in said datapath.

9. The system of identifying a failure location in a datapath as claimed in claim 8, wherein a second diagnostic cell match counter is provided at a second location in said datapath, said second diagnostic cell match counter recognizing when said diagnostic cell passes said second location and tracking passage of said diagnostic cell past said second location.

10. The system of identifying a failure location in a datapath as claimed in claim 9, wherein said diagnostic cell counter module identifies said failure location as being downstream of said first location when said first diagnostic cell match counter recognizes that said diagnostic cell passed said first location.

11. The system of identifying a failure location in a datapath as claimed in claim 10, wherein said datapath is defined by a VPI/VCI connection, and passage of said diagnostic cell along the datapath is non-disruptive of regular data traffic passing through the communication element.

12. The method of identifying a failure location in a datapath as claimed in claim 1, wherein said datapath traversing said first inactive component passes regular data traffic when the value of said first diagnostic cell match counter indicates that said diagnostic cell passed said first location.

13. The system of identifying a failure location in a datapath as claimed in claim 8, wherein said datapath traversing said first inactive component passes regular data traffic when the value of said first diagnostic cell match counter indicates that said diagnostic cell passed said first location.

\* \* \* \* \*